United States Patent [19]

Sollars

[11] Patent Number: 5,900,025
[45] Date of Patent: May 4, 1999

[54] PROCESSOR HAVING A HIERARCHICAL CONTROL REGISTER FILE AND METHODS FOR OPERATING THE SAME

[75] Inventor: Donald L. Sollars, Milpitas, Calif.

[73] Assignee: ZSP Corporation, Santa Clara, Calif.

[21] Appl. No.: 08/528,509

[22] Filed: Sep. 12, 1995

[51] Int. Cl.[6] ........................................... G06F 9/00
[52] U.S. Cl. ............................................... 712/248
[58] Field of Search ..................... 712/248, 220

[56] References Cited

U.S. PATENT DOCUMENTS

| | | | |
|---|---|---|---|
| 4,038,533 | 7/1977 | Dummermuth | 364/136 |
| 4,071,887 | 1/1978 | Daly et al. | 395/309 |
| 4,354,228 | 10/1982 | Moore et al. | 395/800 |
| 4,434,461 | 2/1984 | Puhl | 364/200 |
| 4,488,227 | 12/1984 | Miu et al. | 364/200 |
| 4,766,566 | 8/1988 | Chuang . | |
| 4,965,801 | 10/1990 | Dulac | 371/40.1 |
| 5,062,073 | 10/1991 | Masuda et al. | 395/856 |
| 5,083,263 | 1/1992 | Joy et al. . | |
| 5,159,678 | 10/1992 | Wengelski et al. | 395/425 |
| 5,179,530 | 1/1993 | Genusov et al. | 364/726 |
| 5,179,702 | 1/1993 | Spix et al. | 395/650 |
| 5,313,648 | 5/1994 | Ehlig et al. . | |
| 5,386,563 | 1/1995 | Thomas | 395/650 |
| 5,398,322 | 3/1995 | Marwood . | |
| 5,467,459 | 11/1995 | Alexander et al. | 395/480 |
| 5,481,719 | 1/1996 | Ackerman et al. | 395/700 |
| 5,493,687 | 2/1996 | Garg et al. | 395/800 |
| 5,495,615 | 2/1996 | Nizar et al. | 395/733 |
| 5,513,366 | 4/1996 | Agarwal et al. | 395/800 |
| 5,517,648 | 5/1996 | Bertone et al. | 395/732 |
| 5,535,404 | 7/1996 | Tsubota | 395/800 |
| 5,546,554 | 8/1996 | Yung et al. | 395/413 |
| 5,553,301 | 9/1996 | New et al. | 395/825 |
| 5,586,275 | 12/1996 | Ehlig et al. | 395/564 |
| 5,611,064 | 3/1997 | Maund et al. | 395/419 |
| 5,630,102 | 5/1997 | Johnson et al. | 395/500 |

OTHER PUBLICATIONS

Blinowski et al., "A Shared Memory Based on the Dataflow Paradigm", IEEE, Jan. 1995, pp. 68–75.

Tremblay et al., "A Three Dimensional Register File For Superscalar Processors", IEEE Proceedings of the 28th Annual Hawaii International Conference on System Sciences, 1995, pp. 191–201.

Motorola "Enhanced 32–bit microprocessor user's manual" 8–6 to 8–7 and 10–1 to 10–3, 1989.

DEC "DECchip 21064–AA Microprocessor Hardware reference manual" 3–1 to 3–2, 1992.

*Primary Examiner*—David Y. Eng
*Attorney, Agent, or Firm*—Pillsbury Madison & Sutro, LLP

[57] ABSTRACT

A processor is provided with a number of control registers logically organized in a hierarchical manner. At the highest level is a set of control registers for controlling the overall system. At the second highest level are multiple sets of control registers for controlling concurrent execution of processes in multiple contexts. At the third highest level are multiple sets of control registers for controlling concurrent execution of multiple process threads for each of the concurrently executing contexts. Besides modifications resulting from the normal course of instruction execution, the control registers are directly accessible and modifiable using instructions of the standard instruction set. Each context/thread is assigned a variable privilege level for accessing and modifying control registers at the various levels. The instruction fetch unit is enhanced to dispatch instructions with appended context and tag identifications. The execution units are enhanced to verify a context/thread's privilege by locating the assigned privilege level using the appended context and thread identification information, before executing any instructions that access/modify a control register. Additionally, the execution units are further enhanced to be dynamically configurable in response to configuration control information stored in a thread level control register set for a thread and/or configuration information integrated with an instruction.

20 Claims, 21 Drawing Sheets

| VIRTUAL ADDR | PHY ADDR | CONTEXT CONTROL REGISTER SET 104 | |
|---|---|---|---|
| VC0 | CR32 | TVTB | 110a |
| VC1 | CR33 | TPC | 110b |
| VC2 | CR34 | CCTL | 110c |
| VC3 | CR35 | CIREQ | 110d |
| VC4 | CR36 | CIMASK | 110e |
| VC5 | CR37 | SWFCTL | 110f |
| ... | | ... | |
| VC24 | CR56 | VTHRD0_INFO | 110y |
| VC25 | CR57 | VTHRD1_INFO | 110z |
| VC26 | CR58 | VTHRD2_INFO | 110aa |
| VC27 | CR59 | VTHRD3_INFO | 110bb |
| VC28 | CR60 | VTHRD4_INFO | 110cc |
| VC29 | CR61 | VTHRD5_INFO | 110dd |
| VC30 | CR62 | VTHRD6_INFO | 110ee |
| VC31 | CR63 | VTHRD7_INFO | 110ff |

FIG. 4

| VIRTUAL ADDR | PHY ADDR | SYSTEM CONTROL REGISTER SET 102 | |
|---|---|---|---|
| VS0 | CR0 | SYS_MEM_BGG | 108a |
| VS1 | CR1 | SYS_MEM_END | 108b |
| VS2 | CR2 | SCTL | 108c |
| VS3 | CR3 | TIC | 108d |
| VS4 | CR4 | PROC_IO | 108e |
| VS5 | CR5 | MEM_ALLOC_MAP_PTR | 108f |
| VS6 | CR6 | SIREQ | 108g |
| VS7 | CR7 | SIMASU | 108h |
| ... | | ... | |
| VS24 | CR24 | VCTXT0_INFO | 108y |
| VS25 | CR25 | VCTXT1_INFO | 108z |
| VS26 | CR26 | VCTXT2_INFO | 108aa |
| VS27 | CR27 | VCTXT3_INFO | 108bb |
| VS28 | CR28 | VCTXT4_INFO | 108cc |
| VS29 | CR29 | VCTXT5_INFO | 108dd |
| VS30 | CR30 | VCTXT6_INFO | 108ee |
| VS31 | CR31 | VCTXT7_INFO | 108ff |

FIG. 3

MACRO-TRAP CONTROL REGISTER SET 0 — 107

| VIRTUAL ADDR | PHY ADDR | | |
|---|---|---|---|
| VM0 | CR1312 | PC | 113a |
| VM3 | CR1315 | STATUS/COMMAND | 113d |

FIG. 6

THREAD CONTROL REGISTER SET 0 — 106

| VIRTUAL ADDR | PHY ADDR | | |
|---|---|---|---|
| VT0 | CR64 | PC | 112a |
| VT1 | CR65 | RPC | 112b |
| VT2 | CR66 | TCTL | 112c |
| VT3 | CR67 | FCC | 112d |
| VT4 | CR68 | HWFLAG | 112e |
| VT5 | CR69 | SWFLAG | 112f |
| VT6 | CR70 | SWFOFST | 112g |
| ... | | | |
| VT15 | CR79 | | 112p |

FIG. 5

PROCESSOR HAVING A HIERARCHICAL CONTROL REGISTER FILE AND METHODS FOR OPERATING THE SAME

BACKGROUND OF THE INVENTION

1. Field of the Invention

The present invention relates to the field of computer systems. More specifically, the present invention relates to their processors, in particular, the control registers.

2. Background Information

All computer system processors include a number of control registers[1] for controlling system operations. The number of control registers included and their specific usage vary from processor to processor. Some processors include only control registers for managing basic system operations, such as instruction fetching/execution (i.e. the program counter register), interrupt/exception handling and so forth. Other processors include additional control registers for controlling various hardware and/or operation mode selections, such as whether a processor is to operate in an "enhanced" mode or a backward compatible "emulation" mode, whether certain hardware checking is to be performed, whether certain interrupts are to be recognized, and so forth. Yet other processors further include control registers for assisting the operating system in managing system resources, such as memory management, process/context switching, procedure call and return, and so forth.

[1] For the purpose of this application, the term "control registers" includes system registers, memory registers, and the like, used for controlling the operation of a computer system.

Typically, the control registers are included in an unorganized manner. In other words, there is no particular organizational relationship between one particular/group of control registers provided for one purpose with another particular/group of control registers provided for another purpose. As the number of control registers being provided continues to increase, it is desirable that the control registers be organized in some coherent manner.

Additionally, direct modifications of the control registers (as opposed to modifications made as a result of the normal course of instruction execution) are made through the use of special instructions (as opposed to using instructions from the standard instruction set). For security and system reliability reasons, these special instructions are usually available only to certain privileged processes. This conventional approach of employing special instructions has the disadvantage of burdening the instruction fetch and dispatch unit, due to the increased number of opcodes to be decoded. As processor speed continues to increase, an increasing number of instructions are required to keep the processors "fully" utilized. Thus, it is also desirable to be able to use instructions from the standard instruction set to directly modify the control registers, provided security and system reliability can be maintained.

As will be disclosed in more detail below, the present invention achieves these and other desirable results.

SUMMARY OF THE INVENTION

A processor is provided with a number of primary control registers logically organized into a hierarchy having two or more control register levels. Under the presently preferred embodiment, the primary control registers are logically organized into three control register levels. At the highest level of the logical hierarchy is a set of control registers for controlling the overall system. At the second highest level of the logical hierarchy is a number of control register sets for controlling concurrent execution of processes in multiple peer contexts (hereinafter simply contexts). At the third highest level of the logical hierarchy is a number of control register sets for controlling concurrent execution of multiple peer process threads (hereinafter simply threads) for each of the concurrently executing peer contexts.

In one implementation of the preferred embodiment, eight sets of context control registers are provided for concurrently supporting up to eight active contexts, and 64 sets of thread control registers are provided for concurrently supporting up to eight active threads for each of the active contexts. Each of the system and context control register sets comprises 32 control registers, whereas each thread control register set comprises 16 control registers.

The system control register set includes, in particular, a number of active context control registers for storing corresponding basic control information about the concurrently executing active contexts. The basic control information includes execution priorities and control register access/modification privileges of the contexts. Each context control register set includes, in particular, a number of active thread control registers for storing corresponding basic control information about the concurrently executing active threads. The basic control information includes execution priorities and control register access/modification privileges of the threads. Each thread control register set includes, in particular, a hardware defined flag register, a software defined flag register, a software flag control register for storing a pointer to a software defined flag array for the thread's context from which the thread's software defined flag register is to be obtained, and a functional unit control register for storing control information for dynamically configuring applicable functional units to the requirements of the thread.

The system control register set is allocated to and initialized by the operating system during system start up. The context and thread control register sets are dynamically allocated to the contexts and threads and initialized by the operating system, when the contexts and threads are spawned by their "parent" processes; except the operating system context, including the "micro-kernel" thread, which is established as part of system start up. Under the presently preferred embodiment, when allocating context/thread control register sets to contexts/threads being spawned, the "micro-kernel" thread advantageously performs a number of allocation sub-tasks via macro-traps, in particular, the sub-task of saving the state of a context/thread having to be deallocated. These macro-traps cause corresponding macro-trap library routines (MLRs) to be executed as "mini child processes" of the "micro-kernel" thread, concurrent with the other active contexts and threads. The processor is further provided with a writeable control store facility, an auxiliary control register file, and an auxiliary operand register file. The writeable control store is used for storing the MLRs. Subsets of the auxiliary control register file are correspondingly allocated to the MLRs to facilitate their concurrent executions. Each subset includes, in particular, a status/command control register for facilitating status/command exchanges between a child MLR and its parent thread. Collectively, the "subsets" constitute the fourth highest level of the control register logical hierarchy. The auxiliary operand register file is used by the MLRs during execution. The MLRs are invoked in like manner as conventional interrupts and exceptions, in response to detection of the macro-traps.

Additionally, the processor is further provided with an enhanced instruction fetch unit for concurrently fetching, decoding and dispatching instructions for the active threads and the MLRs. The enhanced instruction fetch unit includes a plurality of fetch buffers, a plurality of decoders, a plurality of dispatch queues, dispatch queue selection circuitry and control circuitry for concurrently fetching, decoding, and dispatching instructions to the functional units for selected ones of the active threads and MLRs. Instructions of the active threads (including their offspring MLRs) are dispatched to the functional units with context and thread identifications, preferably in the form of tags, appended to them.

Furthermore, selected functional units are enhanced to be responsive to the proper thread level dynamic configuration control information. The proper thread level dynamic configuration control information is discerned by the functional units using the appended context and thread identification tags.

In the presently preferred embodiment, in addition to the functional unit dynamic configuration control provided at the thread level through the thread's functional unit control register, functional unit dynamic configuration is also provided at the instruction level through functional unit control information included as an integral part of the instructions. The functional units are further enhanced to be responsive to this integrated dynamic configuration control information.

Besides modifications resulting from the normal course of instruction execution, i.e., status updates and the like, the control registers are directly accessible and modifiable using instructions of the standard instruction set. The instructions include, in particular, a branch-on-flag instruction for effectuating instruction branching based on the values of the hardware/software flags, Boolean instructions for performing logic operations upon the control registers, and a move instruction for moving "data" between the control registers, as well as between the control and operand registers.

A context and thread based privilege structure that leverages on the manner the control registers are logically organized is employed to control the direct accesses and modifications. The functional units are further enhanced to ensure the instructions' threads/contexts have the necessary privileges to access and modify the target control registers. The privileges possessed by the instructions' threads/contexts are located using the instructions' appended context and thread identification tags.

Under the presently preferred embodiment, a thread is initially conferred a standard thread privilege, which allows the thread to access and modify its own set of control registers. On an as needed basis, one of the threads of each context can be temporarily conferred a context privilege, which allows the context privileged thread to also access and modify its context's context level control register set as well as its peer threads' control register sets. Similarly, on an as need basis, one of the contexts (more specifically, one of the context privileged threads) can be temporarily conferred a system privilege, which allows the system privileged context to also access and modify the system level control register set as well as any one of the other "lower" level control register sets.

The conditions under which the privileges are dynamically conferred to and withdrawn from the various threads and contexts are implementation dependent. Under the presently preferred embodiment, the conditions include, in particular, the conditions of encountering certain execution exceptions, under which a thread will be temporarily conferred the privilege for accessing and modifying its context's control register set, and a context will be temporarily conferred the privilege for accessing and modifying the system set of control registers, by the exception service routines, while the exceptions are being serviced.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates one embodiment of the control register set at the system level of the logical hierarchy;

FIG. 4 illustrates one embodiment of a control register set at the context level of the logical hierarchy;

FIG. 5 illustrates one embodiment of a control register set at the thread level of the logical hierarchy;

FIG. 6 illustrates one embodiment of a control register set at the macro-trap level of the logical hierarchy;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
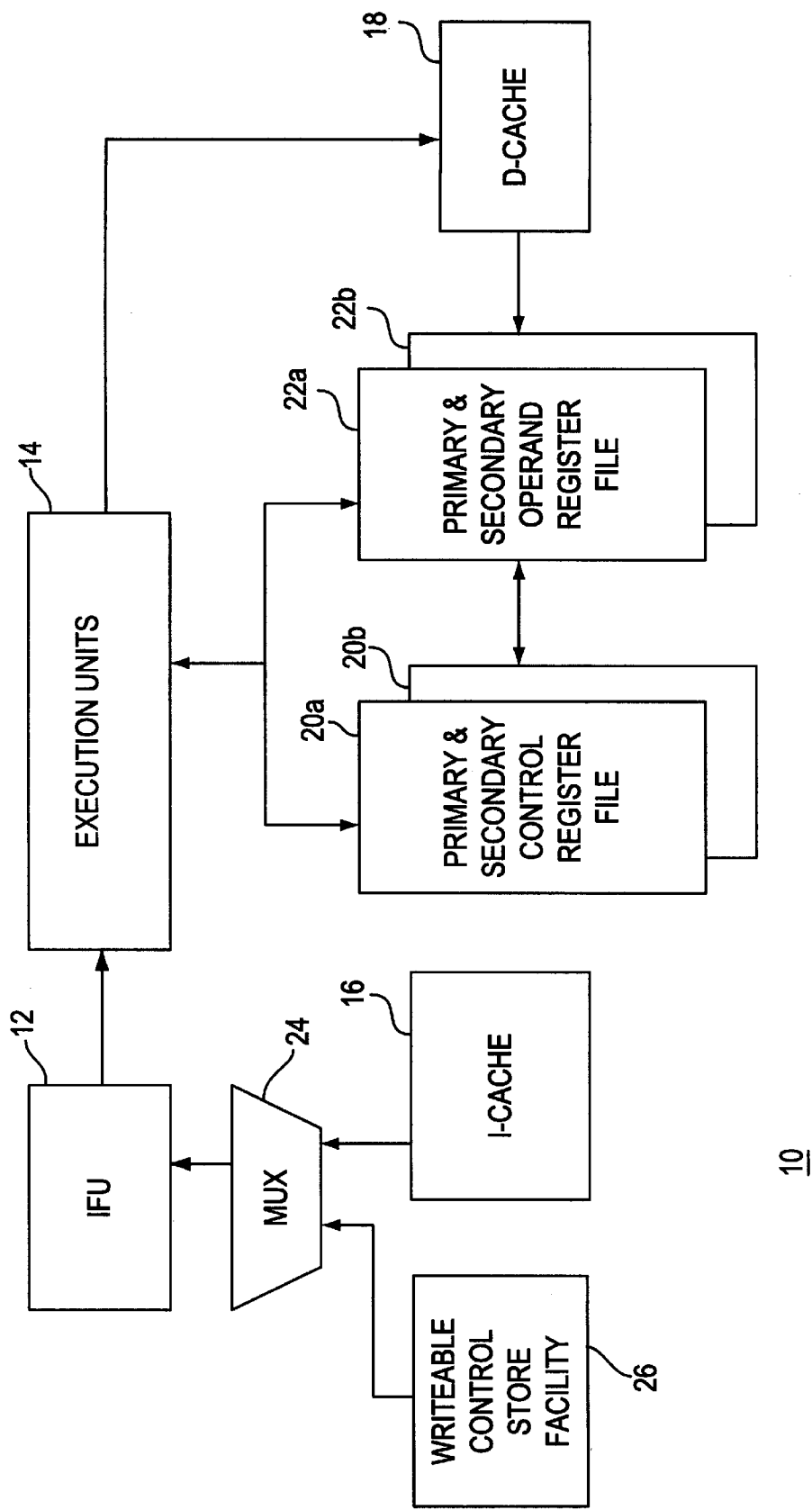
FIG. 1 illustrates an exemplary processor incorporating the teachings of the present invention.

Referring now to FIG. 1, the major functional blocks of exemplary processor 10 incorporated with the teachings of the present invention is illustrated. Exemplary processor 10 includes primary control register file 20a of the present invention, instruction fetch unit (IFU) 12 and execution units 14, both incorporated with the teachings of the present invention. Additionally, processor 10 includes operand register file 22a, instruction cache (I-cache) 16, and data cache (D-cache) 18. Preferably, processor 10 further includes auxiliary control register file 20b, auxiliary operand register file (AORF) 22b, writeable control store facility (WCSF) 26 and multiplexor 24. These elements are coupled to each other as shown.

I-cache 16 and D-cache 18 perform their conventional functions in conventional manners, which are well known and will not be further described. Primary operand register file 22a includes a number of registers for performing the conventional function of storing instruction operands in a new and innovative manner. Preferably, primary operand register file 22a is a scalable uni/multidimensional as well as virtually/physically addressable register file, used for storing integer as well as floating point operands, as disclosed in copending U.S. patent application, application Ser. No. 08/401,411, having common inventorship with the present invention, which is hereby fully incorporated by reference.

Primary control register file 20a comprises a plurality of control registers for performing the conventional functions of storing control and status information of executing processes, but also in a new and innovative manner. As will be described in more detail below, control registers of primary control file 20a are organized into control register sets, which are in turn organized into a logical hierarchy having two or more control register levels, with each level having one or more control register sets, to facilitate a hierarchical approach to the control of the overall system and concurrent execution of processes in multiple peer contexts, including concurrent execution of multiple peer process threads for the executing contexts. Except for the initial allocations at system start up time, the control register sets at the various levels are dynamically allocated to the contexts and the threads during operation. Besides modifications as a result of instruction execution, i.e., status update and the like, the control registers are directly accessible and modifiable using instructions from the standard instruction sets of exemplary processor 10. A context and thread based privilege structure is employed to control the direct accesses and modifications. These and other aspects of control register file 20a will be described in more detail below.

Auxiliary control register file 20b augments the primary control register file 20a. It also comprises a plurality of control registers for performing the conventional function of storing control and status information of executing processes, but also in a new and innovative manner. More specifically, a number of its control registers are organized into "small" partitioned subsets for controlling execution of macro-trap library routines (MLRS) for servicing macro-traps issued by the executing threads, concurrent with the execution of "main line" contexts and threads controlled by the hierarchical control register sets of primary control register file 20a. When used, collectively the partitioned control register subsets constitute a new subordinated control register level of the control register logical hierarchy. These and other aspects of auxiliary control register file 20b will also be described in more detail below.

WCSF 26 is used to store the macro-trap library routines (MLRs) and AORF 22b is used by the MLRs during their executions, as disclosed in copending U.S. patent application, application Ser. No. 08/440,993, also having common inventorship with the present invention, which is hereby fully incorporated by reference. Under the presently preferred embodiment, WCSF 26 includes a number of MLRs for performing a number of control register set allocation sub-tasks, to be described more fully below. Multiplexor 24 performs its conventional function, facilitating selective fetching of instructions from I-cache 16 or WCSF 26.

IFU 12 performs its conventional function of fetching, decoding and dispatching instructions to execution units 14, but also in a new and innovative manner. In accordance with the present invention, IFU 12 is enhanced to be able to concurrently fetch, decode, and dispatch instructions for a plurality of active threads of the various active contexts, and the active threads' child MLRs. Similarly, execution units 14 perform their conventional function of executing instructions in a new and innovative manner. In accordance with the present invention, execution units 14 are enhanced to enforce the privilege structure for directly accessing and modifying the control registers of primary control register file 20a. Additionally, some of the functional units of execution units 14 are also enhanced to be dynamically configurable to perform different functions or variations of functions, in response to functional unit dynamic configuration control information stored in a thread's allocated control register set and/or included as an integral part of an instruction.

Figure 2:
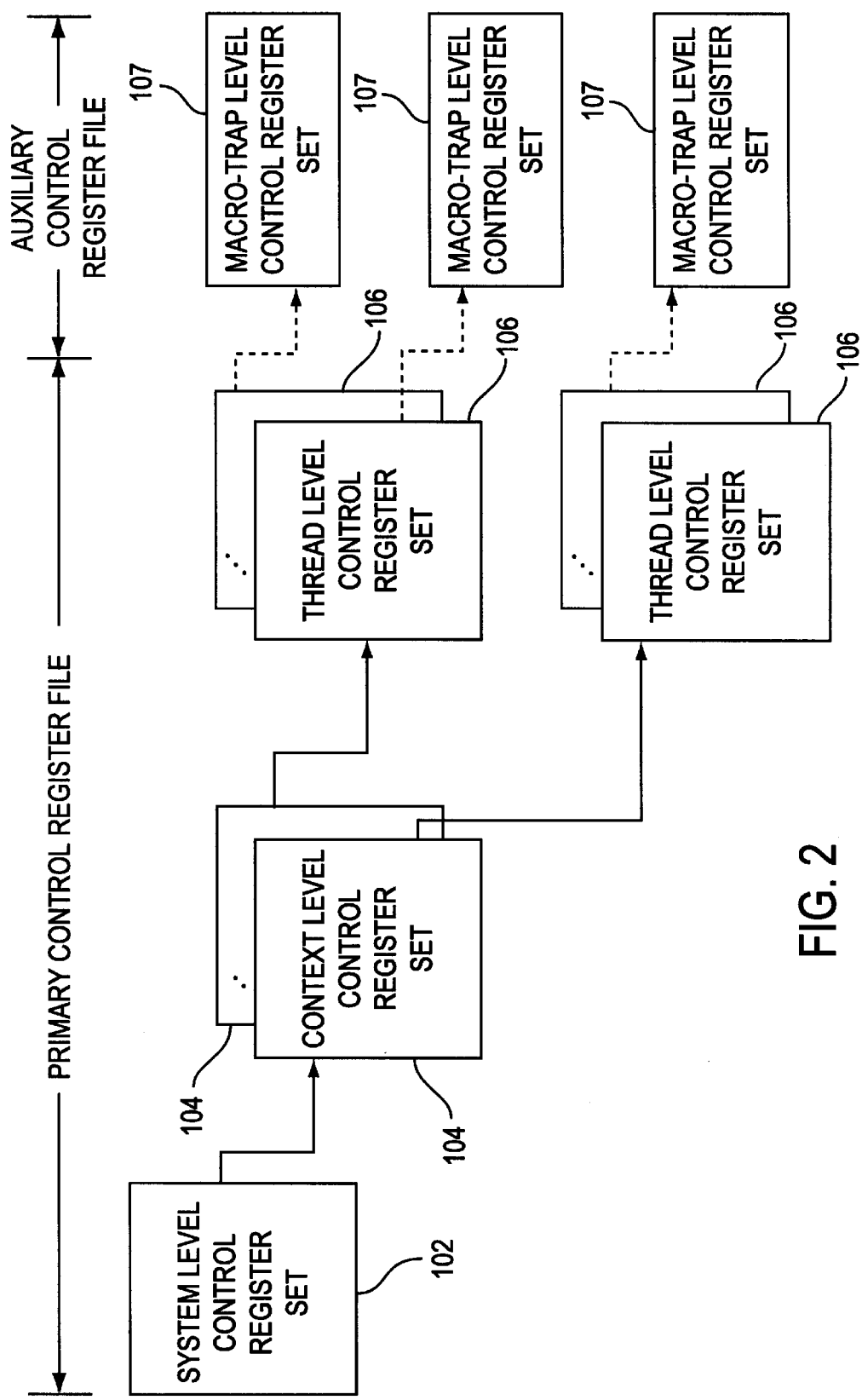
FIG. 2 illustrates a logical view of the control registers in accordance with the present invention.

FIG. 2 illustrates a logical view of the control registers under the presently preferred embodiment of the present invention. As shown, control registers of primary control register file 20a are organized into registers sets 102, 104, and 106, which in turn are organized into a hierarchy having three control register levels, i.e. a system level, a context level, and a thread level. At the highest level is a set of control registers 102 for controlling overall system operation. At the second highest level are multiple sets of control registers 104 for controlling concurrent execution of processes in multiple peer contexts. At the third level are multiple sets of control registers 106 for controlling concurrent execution of multiple peer process threads of the concurrently executing contexts.

Furthermore, when employed, partitioned subsets 107 of auxiliary control register file 20b constitute a fourth level of the control register logical hierarchy. As described earlier, partitioned subsets 107 are used to control executions of MLRs, concurrent with the execution of "main line" contexts and threads controlled by context level control register sets 104 and thread level control register sets 106.

The number of control registers to be included in system level control register set 102, the number of context level control register sets 104 to be provided, the sizes of context level control register sets 104, the number of thread level control register sets 106 to be provided, the sizes of thread level control register sets 106, the number of partitioned subsets 107 to be provided, as well as the sizes of partitioned subsets 107 are all implementation dependent, subject only to the limitation of VLSI technology for integrating a sufficient number of control registers on chip. An embodiment where 32 control registers are provided for system level control register set 102 and each of 8 context level control register sets 104, 16 control registers are provided to each of 64 thread level control register sets 106, and 4 control registers are provided to each of 4 macro-trap level partitioned subsets 107, with each control register being 64 bits wide, is easily achievable under today's VLSI technology.

On the other hand, the present invention may be practiced with multiple context level control register sets 104, each having only one thread level control register set 106 (i.e., multiple single threaded contexts), or one context level control register set 104 having multiple thread level control register sets 106 (i.e., a single context of multiple threads), or even one context level control register set 104 having one thread level control register set 106 (i.e. a single context of a single thread). These are merely degenerate cases of the general multi-contexts, multi20 threads model. In the case of a single context implementation, the system and context levels can be "collapsed" into a single system/context level. Similarly, in the case of a single thread per context implementation, the context and thread levels can also be "collapsed" into a single context/thread level. Furthermore, the use of MLRs and their affiliated facilities, i.e. WCSF 26, auxiliary control register file 20b etc., are merely preferable.

While for ease of explanation, the present invention is being described with each context set of control registers 104 having equal number of predetermined corresponding thread level control register sets 106, a person skilled in the art will appreciate that the present invention may also be practiced with each context set of control registers 104 having a different number of dynamically associated thread level control register sets 106 "drawn" from a common pool of thread level control register sets. The dynamic association and de-association of thread level control register sets 106 to a context level control register set 104 may be achieved using any number of allocation/deallocation techniques known in the art.

FIGS. 3–6 illustrate the contents of the various control register sets and partitioned subsets under the presently preferred embodiment. As shown in FIG. 3, system level control register set 102 preferably comprises a Sys_mem_beg control register 108a, a Sys_mem_end control register 108b, a SCTL control register 108c, a TIC control register 108d, a Proc_id control register 108e, a mem_alloc_map_ptr control register 108f, a SIREQ control register 108g, and a SIMASK control register 108h. Sys_mem_beg and Sys_mem_end control registers 108a and 108b are used to store the starting and ending locations of system memory. SCTL control register 108c is used to store values for various system variables. TIC control register 108d is used to store a counter that is incremented in a predetermined constant rate, allowing software to have a constant time base to work with. Proc_id control register 108f is used to store an identifier identifying the processor. Mem_alloc_map_ptr 108f is used to store a pointer to the system's memory allocation map. SIREQ control register 108g is used to store system interrupt requests at various priority levels, whereas SIMASK control register 108h is used to enable/disable interrupts of a particular priority level for the system. Sys_mem_beg 108a, Sys_mem_end 108b, proc_id 108e, mem_alloc_map_ptr 108f, SIREQ 108g and SIMASK 108h are known in the art and will not be further described. The TIC and SCTL control registers 108c–108d will be described in more detail below.

Additionally, for the illustrated embodiment, system level control register set 102 also includes VCTXT0_Info through VCTXT7_Info control registers 108y–108ff. VCTXT0_Info through VCTXT7_Info control registers 108y–108ff are used to store basic control information about the active contexts, which will also be described in more detail below.

For the illustrated embodiment, control registers 108a–108ff are assigned physical control register addresses CR0–CR31 correspondingly. Control registers 108a–108ff are addressable using virtual control register addresses VS0–VS31 (relative to the base of system control register set 102) or using physical control register addresses CR0–CR31.

As shown in FIG. 4, context level control register set 104 preferably comprises a TVTB, a TPC, a CIREQ, and a CIMASK control register 110a–110b, and 110d–110e. TVTB and TPC control registers 110a–110b are used to store a trap vector table base address, and a return address to be used at the end of trap processing for the context. CIREQ control register 110d is used to store interrupt requests at various priority levels, whereas CIMASK control register 110e is used to enable/disable interrupts of a particular priority level for the context. TVTB, TPC, CIREQ, and CIMASK control registers 110a–110b and 110d–110e are well known in the art, and will not be further described.

Additionally, context level control register set 104 also includes SWFCTL 110f, and VTHRD0_Info through VTHRD7_Info control registers 110y–110ff. SWFCTL 110f is used to store a base address pointer to a software flag register array and the array size for the context, to be described more fully below. VTHRD0_Info through VTHRD7_Info control registers 110y and 110ff are used to store basic control information about the active threads of the context. VTHRD0_Info through VTHRD7_info control registers 110y–110ff will be described in more detail below.

For the illustrated embodiment, control registers 110a–110ff of exemplary context control register set 104 are assigned physical control register addresses CR32–CR63 correspondingly. Control registers 110a–110ff are addressable using either virtual control register addresses VC0 through VC31 (relative to the base of exemplary context level control register set 104) or physical control register addresses CR32–CR63.

As shown in FIG. 5, thread level control register set 106 preferably comprises a PC and an RPC control register 112a–112b. PC and RPC control registers 112a–112b are used to store the address of the current instruction being executed, and a return address to be used at the end of a procedure call for the thread. PC and RPC control registers 112a–112b are well known in the art, and will not be further described.

Additionally, control register set 106 also includes a TCTL, an FCC, an HWFLAG, an SWFLAG, and an SWFOFST control register 112c–112g. TCTL control register 112c is used to store various control information to be used to govern the thread's execution. FCC control register 112d is used to store functional unit configuration control information for dynamically configuring application functional units for the thread. HWFLAG and SWFLAG control registers 112e–112f are used to store the current values of various hardware defined and software defined flags for the thread. SWFLAG control register 112f is also used to facilitate the exchange of status and commands with a child MLR of the thread. SWFOFST control register 112g is used to store an offset from the first software flag register entry of the thread in the software flag array of the thread's context. TCTL, FCC, HWFLAG, SWFLAG, and SWFOFST control registers 112c–112g will be described in more detail below.

For the illustrated embodiment, control register 112a–112p of exemplary control register set 106 are assigned control register addresses CR64–CR79 correspondingly. Control register 112a–112p are addressable using either virtual control register addresses VT0 through VT15 (relative to the base of exemplary thread level control register set 106) or physical control register addresses CR64–CR79.

As shown in FIG. 6, macro-trap level partitioned subset 107 preferably comprises a PC and a Status/Command control register 113a and 113d. PC control register 113a is used to store the program counter for an MLR, whereas Status/Command control register 113d is used to facilitate the exchange of status and commands between the MLR and its parent thread. PC and Status/Command control registers 113a and 113d, except for the manner Status/Command control register 113d is logically connected to the SWLFAG control register 112f of the MLR's parent thread, are well known in the art, and will not be otherwise further described. Control registers 113a–113d of exemplary macro-trap level partitioned subset 107 are assigned physical control register addresses CR1312–CR1315 correspondingly. For the illustrated embodiment, control registers 113a–113d are addressable using either virtual control register addresses VM0 through VM3 (relative to the base of exemplary macro-trap level partitioned subset 107) or physical control register addresses CR1312–CR1315.

Figure 7A:
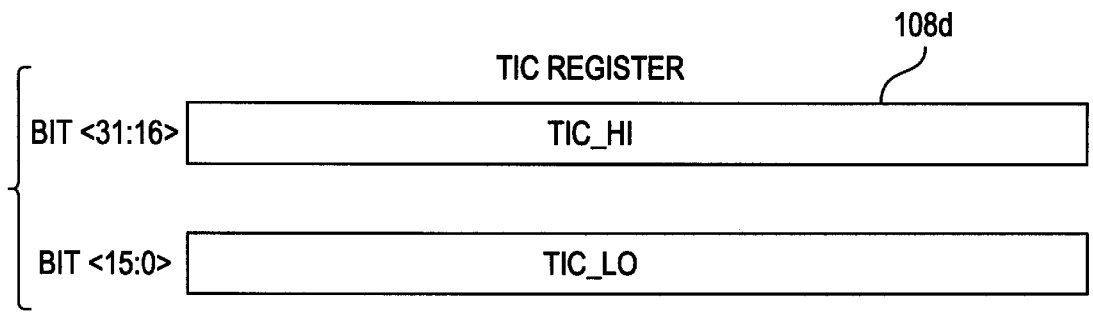
FIGS. 7a–7c illustrate one embodiment each of selected control registers at the system level of the logical hierarchy.

FIGS. 7a–7c, 8a–8c, 9a–9e and 10 illustrate selected ones of the above described control registers in further detail. As shown in FIG. 7a, TIC control register 108d is used to store a counter (TIC_HI+TIC_LO) incremented at a predetermined constant rate, allowing software to have a constant time base to work with. The predetermined constant rate is implementation dependent. It may be set to the system clock rate or set to be changed with changes in the clock rate. Preferably, an implementation will include the support for triggering an interrupt as a result each time TIC register 108d increments from a first predetermined value to a second predetermined value, such as from 0×FFFFFFFF to 0×00000000. The interrupt may be directed to the system or a context, and the priority level of the interrupt may be set to any one of the priority levels supported by a particular implementation, using SIREQ/CIREQ control register 108g/110d. Preferably, corresponding support is also implemented in SIMASK/CIMASK control register 108h/110e for enabling and disabling the triggering of this interrupt.

Figure 7B:
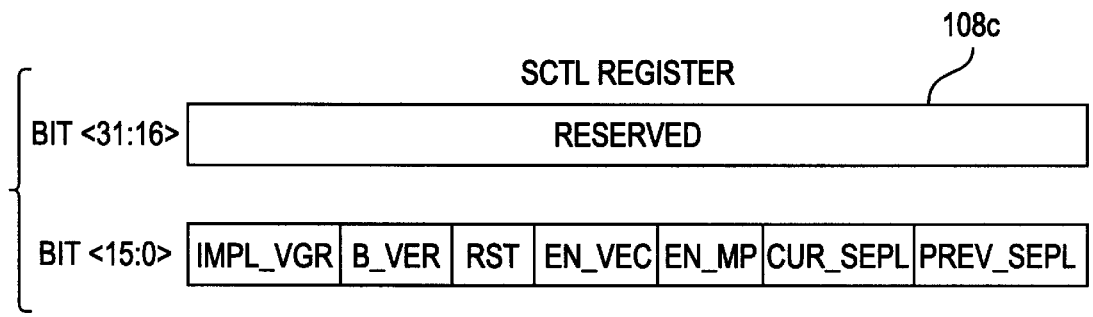

As shown in FIG. 7b, SCTL control register 108c is used to store the current values of a number of system variables for controlling the overall system operation. For the illustrated embodiment, SCTL control register 108c comprises the hardware as well as the operating system version information (Impl_ver and OS_ver). Additionally, SCTL control register 108c further comprises an RST value denoting whether the system is to be reset, an En_Vec value denoting whether vector processing is to be enabled, an En_MP value denoting whether multi-processing is to be enabled, a cur_sepl value denoting the current execution priority level of the operating system, allowing the operating system to preempt all other processes or execute in the background, and a prev_sepl value denoting the immediately preceding execution priority level of the operating system. Among other usage, the cur_sepl value is used to determine whether a system level interrupt should be serviced. The prev_sepl value is updated whenever the cur_sepl value changes.

Figure 7C:
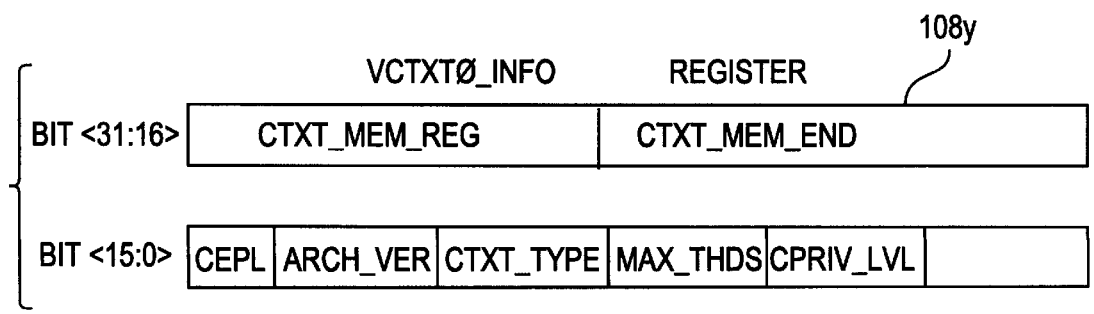

As shown in FIG. 7c, for the illustrated embodiment, exemplary VCTXT0_info control register 108y is used to store the beginning and ending memory locations for exemplary context-0 (CTXT_mem_beg and CTXT_mem_end). Additionally, VCTXT0_info control register 108y is used to store the execution priority level (CEPL), the machine architecture version (Arch_ver), the context type (i.e., vector, scalar etc.), the maximum number of threads (Max_thrds) allowed, and control register access/modification privilege level (CPRIV_Lvl) for an exemplary context-0.

Figure 8A:
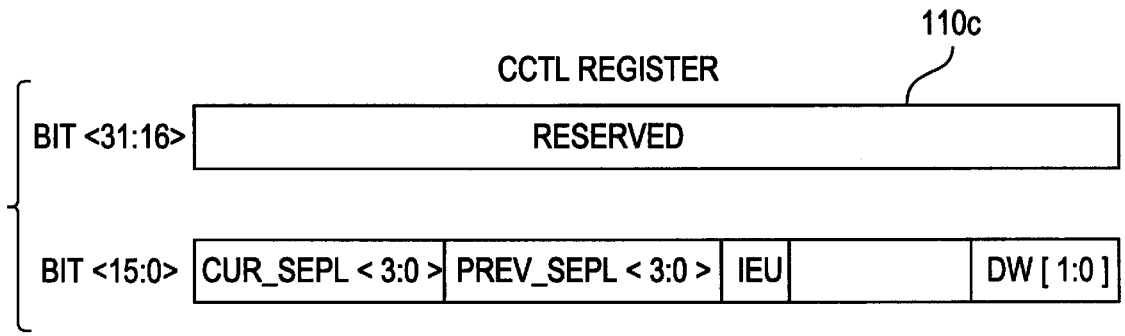
FIGS. 8a–8c illustrate one embodiment each of selected control registers at the context level of the logical hierarchy.

As shown in FIG. 8a, CCTL control register 110c is used to store a number of control values for controlling the execution of the context. For the illustrated embodiment, CCTL control register 110c comprises a cur_cepl value denoting the context's current execution priority level, and a prev_cepl value denoting the context3 s immediately preceding execution priority level. Among other usage, the cur_cepl value is used to determine whether an interrupt should be serviced. The prev_cepl value is updated whenever the cur_cepl value changes. Additionally, CCTL control register 110c further comprises an ien value denoting whether all interrupts are to be enabled or disabled, and a dw value denoting the data width to be used for decoding the instruction stream.

Figure 8B:
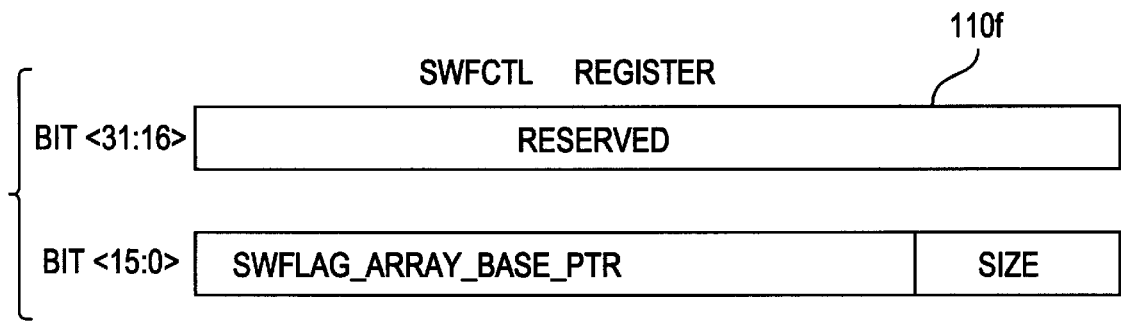

As shown in FIG. 8b, SWFCTL control register 110f is used to store a base address pointer to a software flag register array and the array size for the context, as described earlier. As will be described in more detail below, under the presently preferred embodiment, the software flag register array comprises a plurality of software flag register entries for each active thread of the context. At any point in time, one of the entries is selected and copied into the software flag control register of the active thread.

Figure 8C:
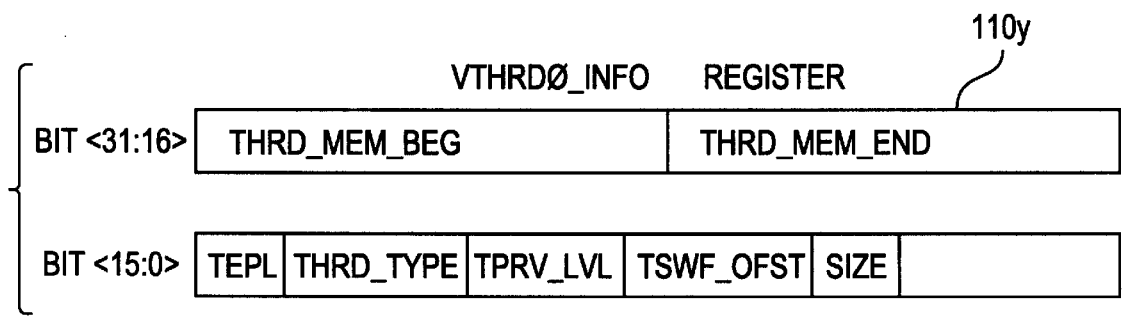

As shown in FIG. 8c, for the illustrated embodiment, VTHRD0_info control register 110y is used to store the beginning and ending memory locations for exemplary thread-0 (THRD_mem_beg and THRD_mem_end). Additionally, VTHRD0_info control register 110y is used to store the execution priority level (TEPL), the thread type (i.e., vector, scalar etc.), the control register access/modification privilege (TPRV_Lvl), an offset (TSWF_OFST) pointing to the first software flag register entry of exemplary thread_0 in the software flag array of exemplary thread_0's context, and a size denoting the number of software flag register entries for exemplary thread_0.

Figure 9A:
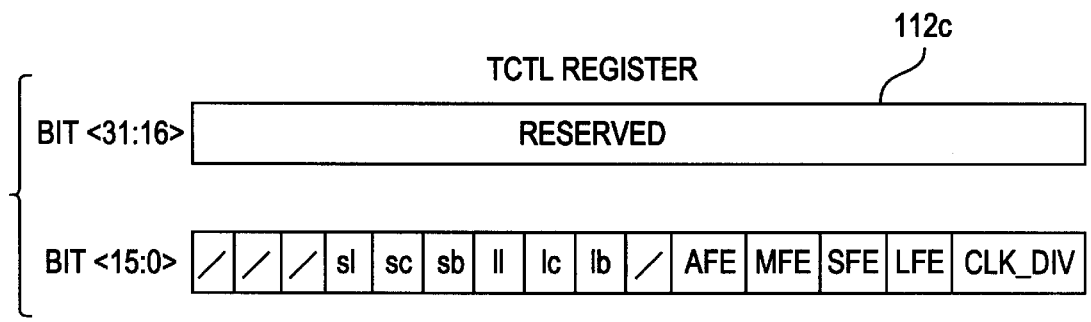
FIGS. 9a–9e illustrate one embodiment each of selected control registers at the thread level of the logical hierarchy.

As shown in FIG. 9a, TCTL control register 112c is used to store a number of control values for controlling the execution of the thread. For the illustrated embodiment, TCTL control register 112c comprises a number of flag values (AFE, MFE, SFE, and LFE) denoting whether update of the HWFLAG control register 112e is to be enabled/disabled for various instructions (i.e. Add, Multiply and Accumulate, Shift and Logic). Additionally, TCTL control register 112c comprises an sl value denoting whether the destination cache line of a store operation is to be locked, an sc value denoting whether the store data of a store operation is cacheable, and an sb value denoting whether store operations are to be forced to complete in program order. TCTL control register 112c further comprises an ll value denoting whether the destination cache line of a load operation is to be locked, an lc value denoting whether the load data of a load operation is cacheable, and an lb value denoting whether load operations are to be forced to complete in program order. Lastly, TCTL control register 112c comprises a clk_div value for halting execution of the particular thread.

Figure 9B:
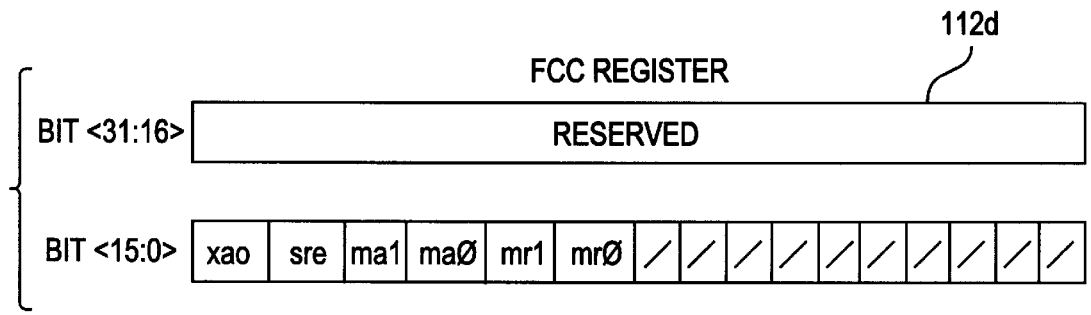

As shown in FIG. 9b, FCC control register 112d is used to store various configuration control values for dynamically configuring applicable functional units for the thread. For the illustrated embodiment, FCC control register 112d includes an xao value denoting whether an extended form of an add operation is to be employed, a sre value denoting whether a shift operation is to implicitly round the shift result, a pair of ma values denoting how the accumulator should perform a multiply operation (e.g. standard precision starting at bit 0, extended precision starting at bit 0, etc.) and a pair of mr values denoting how multiplication results are to be returned (e.g. rounded hi-half, unrounded full precision etc.).

Figure 9C:
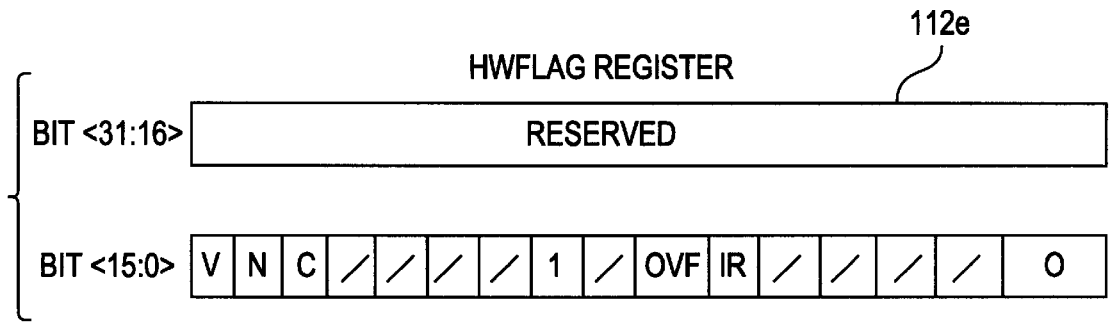

As shown in FIG. 9c, HWFLAG control register 112e is used to store the values of a number of hardware defined flags. For the illustrated embodiment, HWFLAG control register 112e comprises a hard-wired high value (1) and a hardwired low value (0). Additionally, HWFLAG control register 112e further comprises a V value denoting the previous instruction that updated this control register overflowed, an N value denoting the sign of the previous instruction that updated this control register, a C value denoting the carry output of the previous instruction that updated this control register, an OVF value denoting that there was an overflow since the flag was last cleared, and an IR value denoting the logical OR of all interrupt sources, which is particularly useful for polling.

Figure 9D:
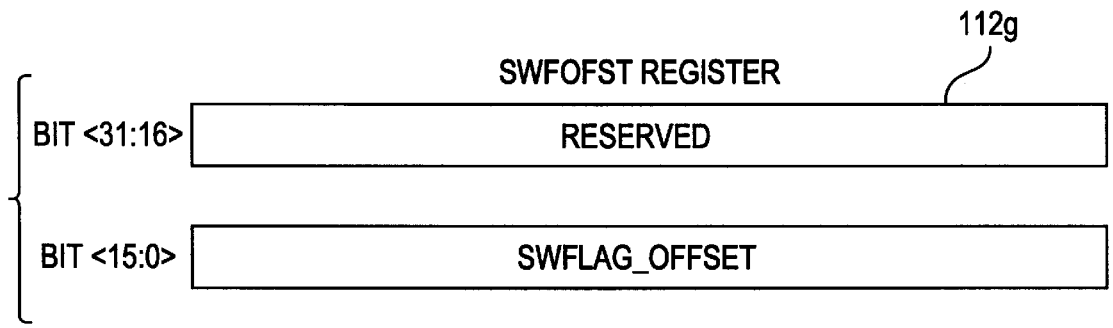
Figure 9E:
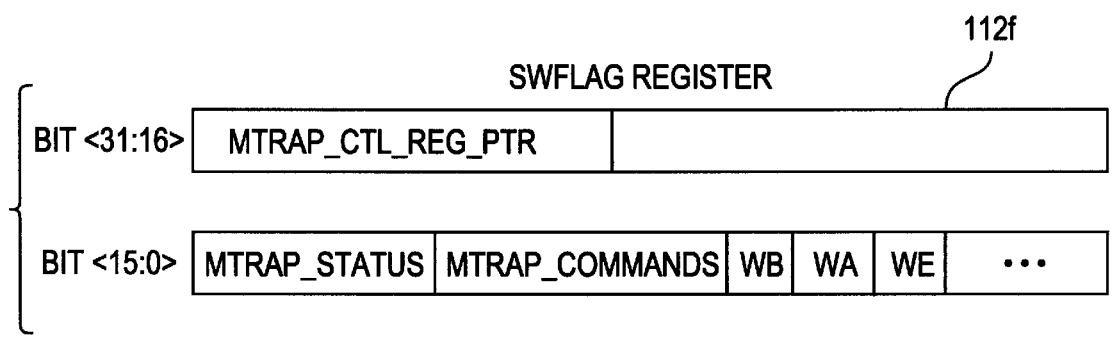
Figure 10:
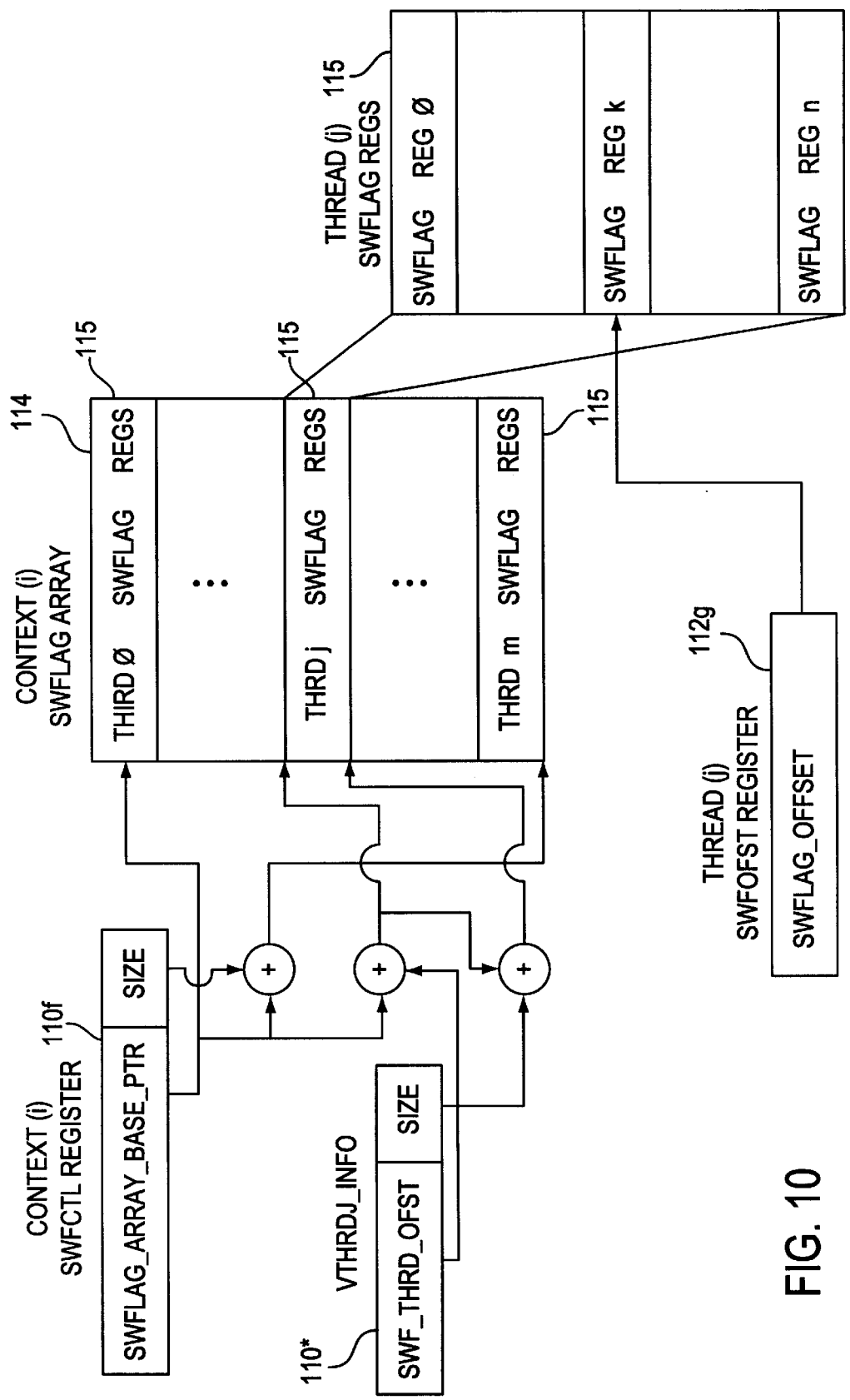
FIG. 10 illustrates the relationship between the SWFCTL and VTHRDx_INFO registers at the context level, the SWFOFST and SWFLAG registers at the thread level, and the SWFLAG array.

As shown in FIGS. 9d–9e and 10, as described earlier, the SWFLAG array 114 that is applicable to a particular context is located using a base address pointer stored in the context's SWFCTL control register 110f. The SWFLAG register entries 115 applicable to a particular thread of the context is located from the base of SWFLAG array 114 using an offset stored in the VTHRD*_Info 110y–110ff. For example, the first group of n1 entries are applicable to exemplary thread-0 of the context, and the fourth group of n2 entries are applicable to exemplary thread-3 of the context.

One or more of the entries applicable to a particular thread may be used to facilitate the exchange of status and commands with child MLRs of the thread. At any point in time, one of the entries is used as the SWFLAG register 112f of the thread. The precise entry to be used is determined through a SWFLAG_Offset stored in SWFOFST control register 112g. For an entry being used to facilitate exchange of status and commands with a child MLR, the SWFLAG control register 112f comprises the address of the first control register of the partitioned subset allocated to the particular MLR, the status and command information, and preferably a number of write control bits for controlling write back of the current content, including a write enable (we) bit, a write allocate (wa) bit, and a writeback (wb) bit.

Having now described the hierarchical structure and the essential contents of the various control registers of primary and auxiliary control register files 20a–20b of the present invention, allocation of the control resource, as well as access and modification of the control registers of primary control register file 20a in accordance with the present invention will now be described with additional references to the remaining figures.

FIGS. 11a–11b, 12a–12b, and 13 illustrate allocation of the various control register sets under the presently preferred embodiment. The system level control register set 102 is allocated to the operating system during system start up. Any number of operating systems supporting multi-processes and multi-threads may be used. Preferably, the operating system performs one or more of the context and thread allocation sub-tasks via macro-traps, including in particular, the sub-task for saving the state of an evicted context/thread, to be discussed more fully below. The context level control register sets 104 are allocated to the contexts by the operating system when the contexts are being spawned by other peer processes, except for the operating system context which is initially established during system start up. Similarly, the thread level control register sets 106 are allocated to the threads by the operating system when the threads are being spawned by other peer process threads, except for the "micro-kernel" thread of the operating system, which is also initially established during system start up. The macro-trap "partitioned subsets" 107 are allocated to the targeted MLRs by the interrupt/exception controller of exemplary processor 10 when the macro-traps are issued by the parent threads.

Figure 11A:
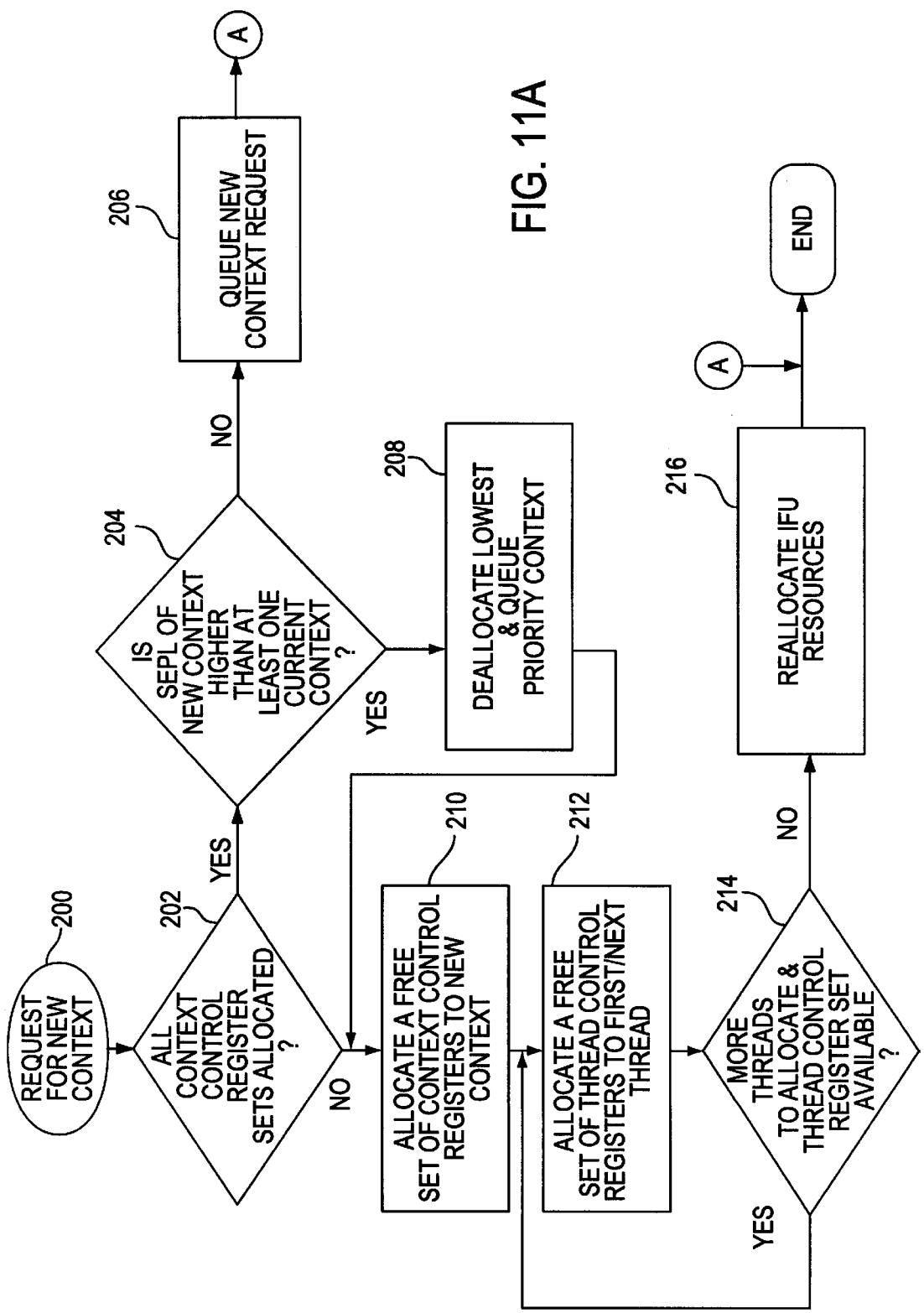
FIGS. 11a–11b illustrate one embodiment of the operational flow for allocating a context level control register set to a context by the operating system.

As shown in FIG. 11a, upon receipt of a valid request for a new context, i.e. from a thread with the proper system privilege, to be described more fully below, step 200, the operating system checks to determine if all context level control register sets 104 have been allocated, step 202. If all context level control register sets 104 have been allocated, the operating system further determines if the execution priority of the "new" context requested is higher than at least one of the allocated contexts, step 204. If the relative priority determination is unfavorable, the operating system simply queues the new context request in a context request queue of processor 10, step 206. On the other hand, if the relative priority determination is favorable, the operating system deallocates and queues the lowest priority allocated context, step 208.

Upon determining that there is at least one free context level control register set 104 at step 202, or creating one through step 208, the operating system allocates a free context level control register set 104 to the "new" context, step 210. Next, the operating system allocates a free thread level control register set 106 to each thread that needs to be created at the same time with the context, until either all required threads have been allocated or all thread level control register sets 106 for the context have been exhausted, steps 212 and 214. The operating system then causes IFU 12 to reprioritize allocation of its internal resources, to be discussed more fully below.

Figure 11B:
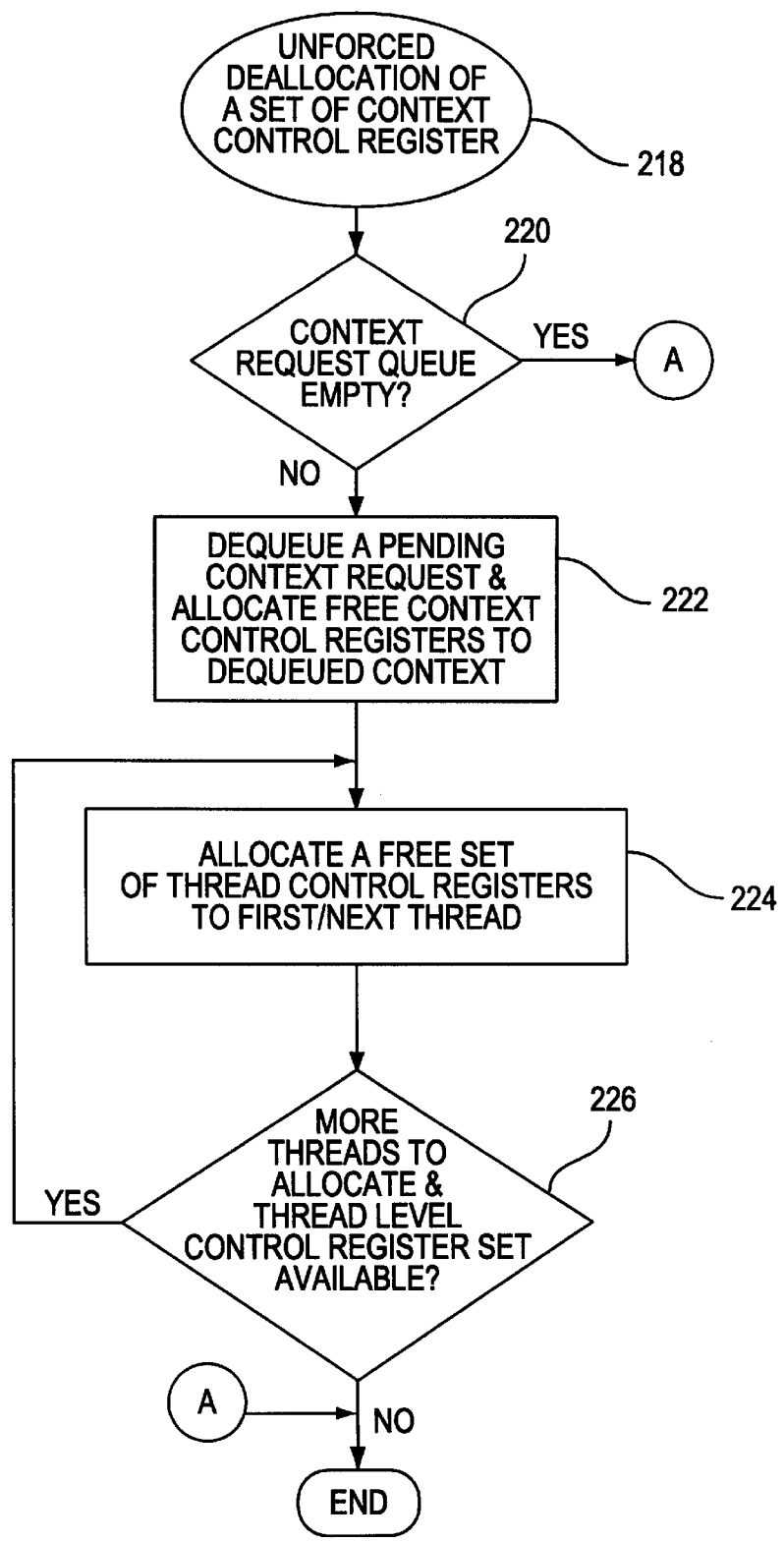

As shown in FIG. 11b, upon detecting each unforced deallocation of a context level control register set 104 (i.e., normal termination of a context), step 218, the operating system determines if the context request queue is empty, step 220. If the queue is empty, the operating system takes no further action. On the other hand, if the queue is not empty, the operating system dequeues a pending context request and allocates the free context level control register set 104 to the dequeued context, step 222. Furthermore, the operating system allocates the thread level control register sets 106 to the threads that needed to be created at the same time, as described earlier, steps 224–226. By virtue of the fact that the context was queued, its execution priority must be lower than those contexts who are currently allocated the internal resources of IFU 12, thus no immediate reprioritization is necessary. The new context will be served in the course of normal resource sharing.

Figure 12A:
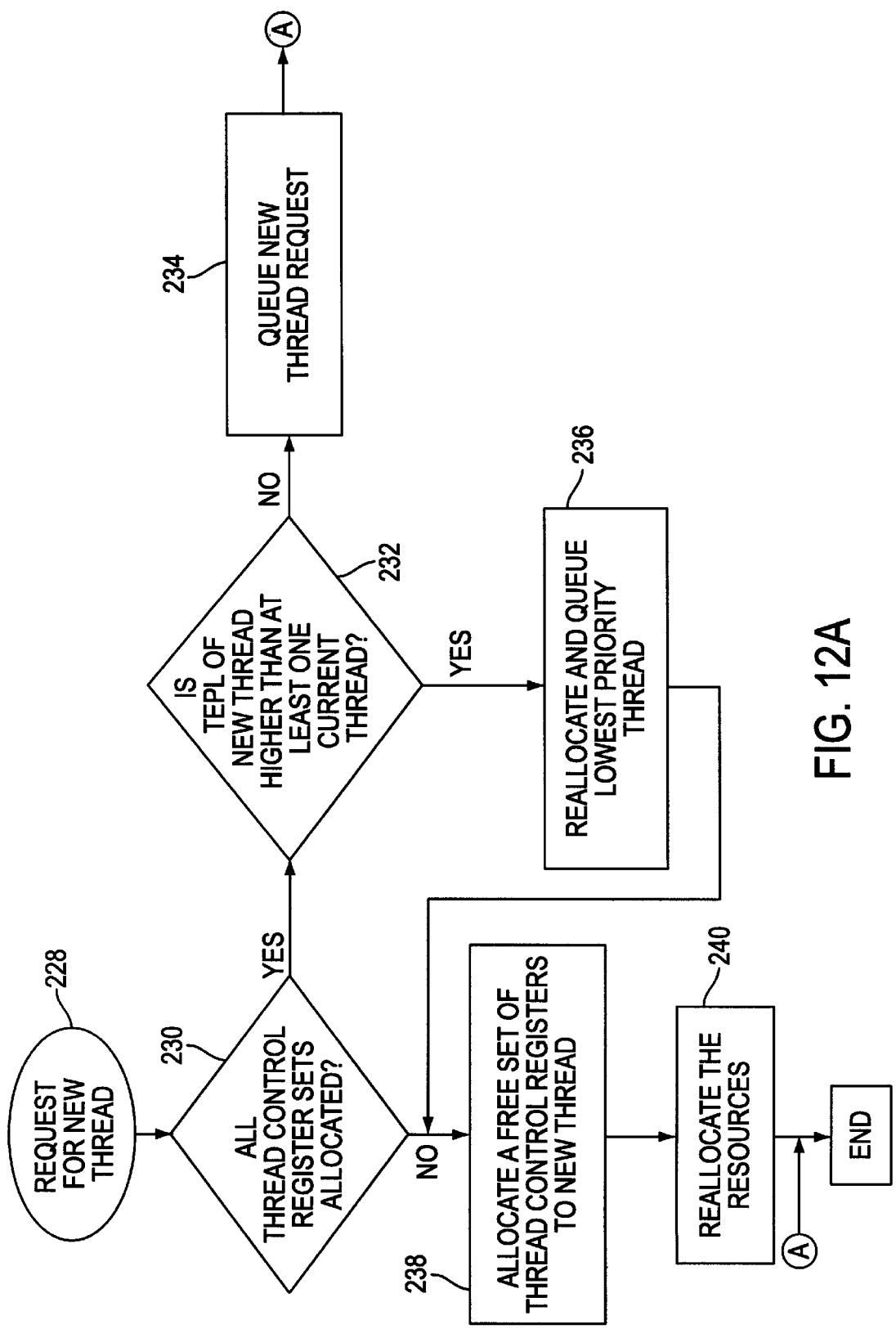
FIGS. 12a–12b illustrate one embodiment of the operational flow for allocating a thread level control register set to a thread by the context.

As shown in FIG. 12a, similarly, upon receipt of a valid request to create a new thread, i.e. from a thread with the proper context privilege, step 228, the context checks to determine if all thread level control register sets 106 have been allocated, step 230. If all thread level control register sets 106 have been allocated, the context further determines if the execution priority of the "new" thread requested is higher than at least one of the allocated threads, step 232. If the relative priority determination is unfavorable, the context simply queues the new thread request in a thread request queue of processor 10, step 234. On the other hand, if the relative priority determination is favorable, the context deallocates and queues the lowest priority allocated thread, step 236.

Upon determining that there is at least one free thread level control register set 106 at step 230, or creating one through step 236, the context allocates a free thread level control register set 106 to the "new" thread, step 238. The context then requests the operating system to cause IFU 12 to reprioritize allocation of its internal resources.

Figure 12B:
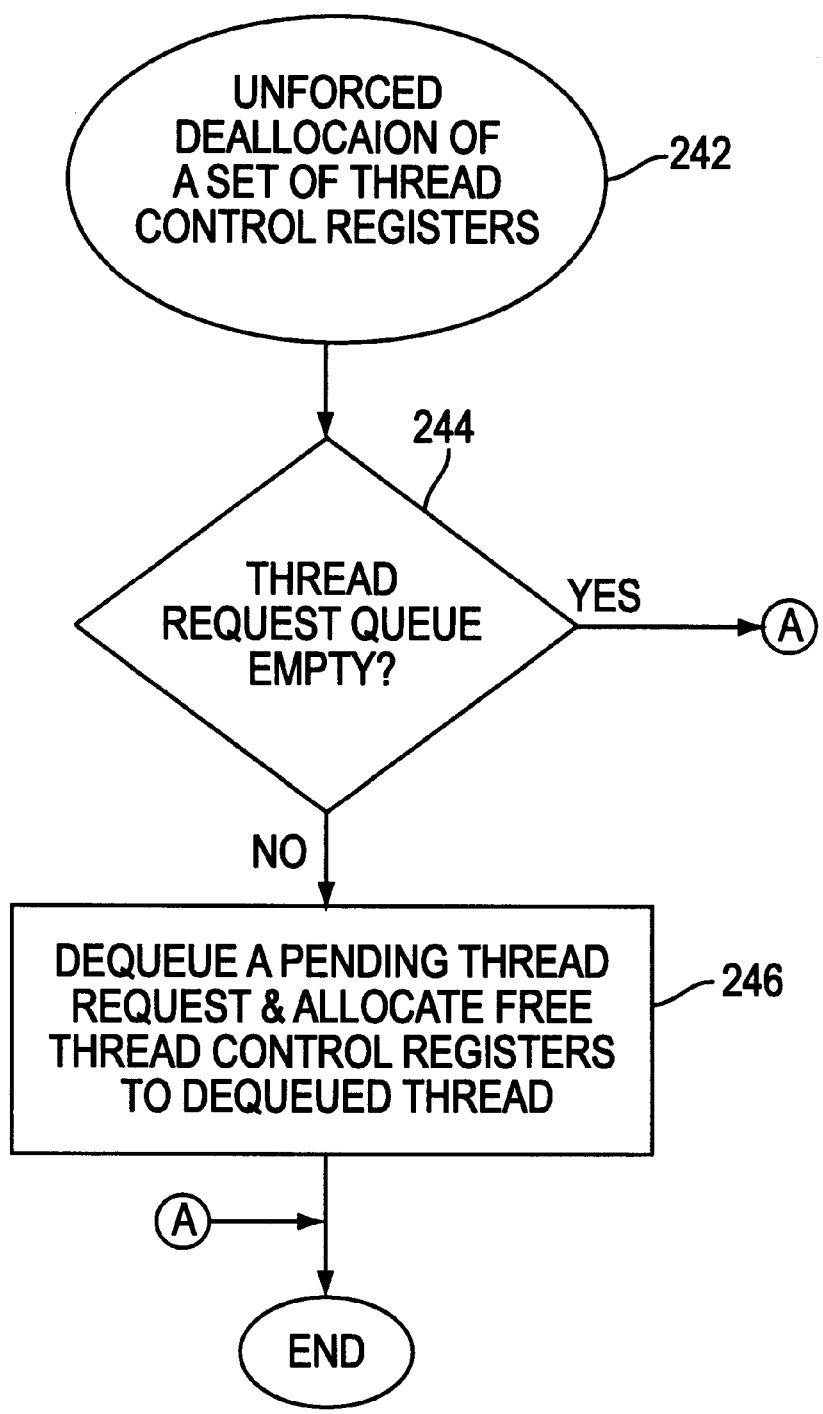

As shown in FIG. 12b, upon detecting each unforced deallocation of a set of thread level control registers 106 (i.e., normal termination of a thread), step 242, the context determines if the thread request queue is empty, step 244. If the queue is empty, the context takes no further action. On the other hand, if the queue is not empty, the context dequeues a pending thread request and allocates the free thread level control register set 106 to the dequeued context, step 246. For the same reason described earlier for the allocation of a dequeued context, no immediate reprioritization of the allocation of the internal resources of IFU 12 is necessary at this time either, so the context makes no re-prioritization request to the operating system.

Figure 13:
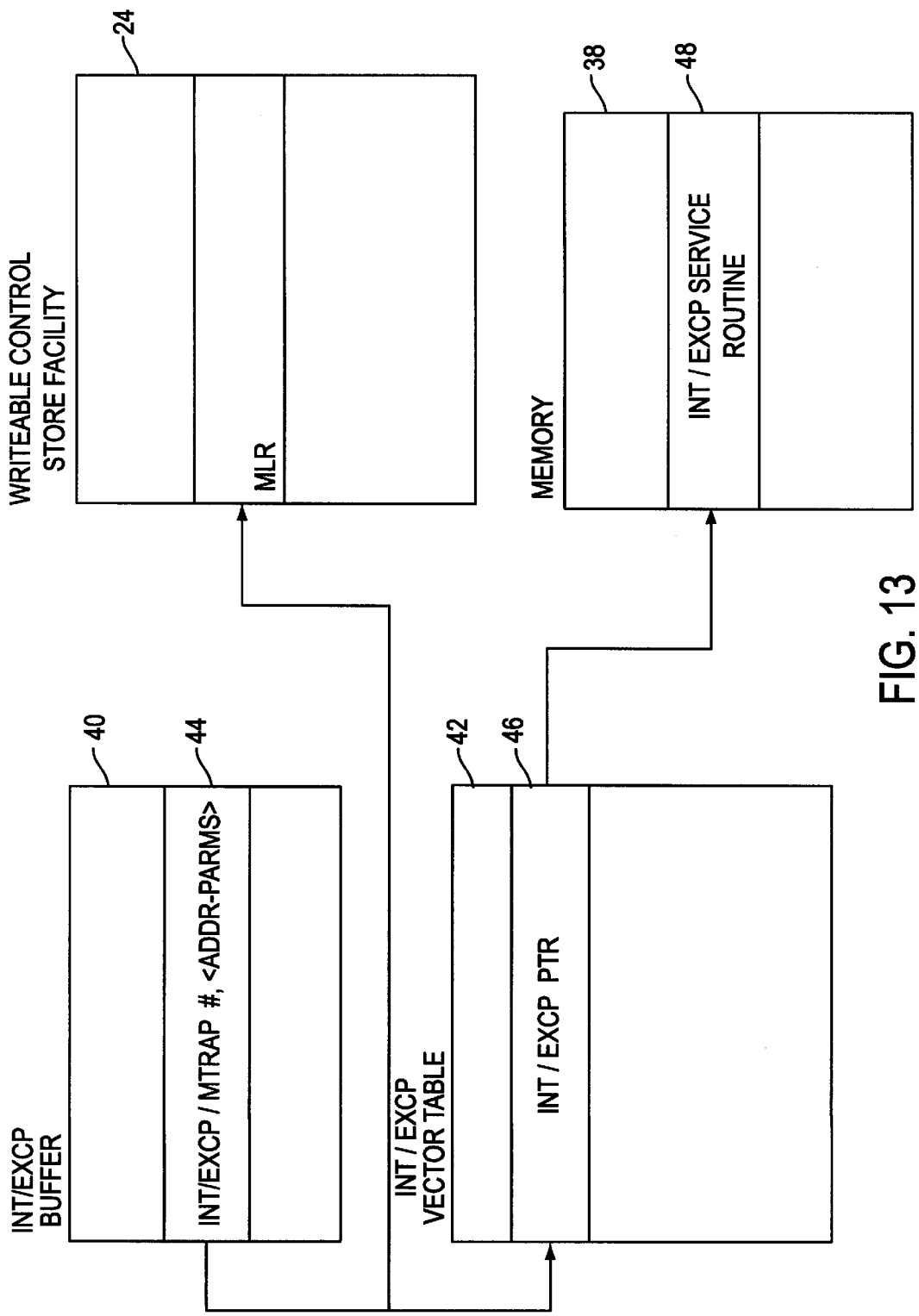
FIG. 13 illustrates invocation of an MLR.

As shown in FIG. 13, a MLR stored in WCSF 24 is invoked and given control in like manner as interrupts and exceptions, through interrupt/exception buffer 40 of exemplary processor 10. Under the presently preferred embodiment, the invoking thread passes a number of parameters to the invoked MLR through the invoking macro-trap, including the offset required to locate the SWFLAG array entry which is used to provide the address of the first control register of the partitioned subset 107 of auxiliary control register file 20b allocated to controlling execution of the invoked MLR, and for exchanging status and commands between the invoking thread and the invoked MLR. The located SWFLAG array entry is automatically synchronized with the status/command control register 113d of the allocated partitioned subset. The interrupt/exception controller of processor 10 services the buffered macro-trap if there is at least one partitioned subset of auxiliary control register file 20b available. For a more detailed description of MLRs, their invocation and usage, see the incorporated by reference copending U.S. Patent application.

Figure 14:
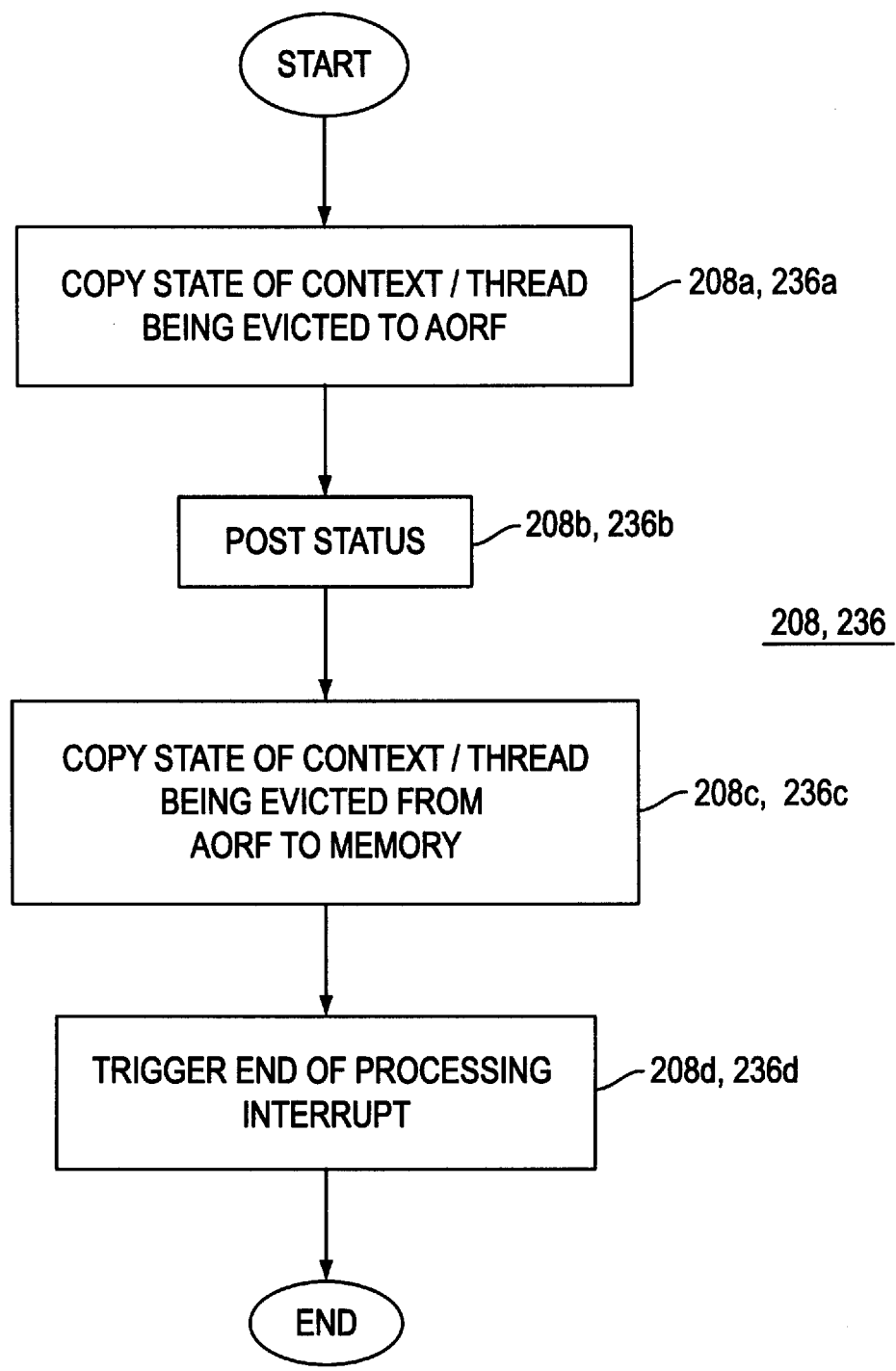
FIG. 14 illustrates the operational flow of an exemplary macro-trap for saving the state of a context being deallocated.

FIG. 14 illustrates one embodiment of an exemplary MLR for saving the state of an evicted context/thread. As shown, upon invocation, the exemplary MLR copies the state information of the context/thread being evicted from its previously allocated context/thread level control register set 104/106 and operand registers to some "scratch" registers in AORF 22b, step 208a/236a. Upon saving a temporary copy, the exemplary MLR updates its status register 113d in the allocated partitioned subset of auxiliary control register file 20b, step 208b/236b, thereby allowing the fact that the context/thread level control register set 104/106 of interest is now available to be detectable by the parent thread. Next, while the parent thread proceeds to allocate the freed up context/thread level control register set 104/106, concurrently, the exemplary MLR copies the temporarily "saved" state information from the "scratch" registers of AORF 22b to system memory, step 208c/236c. Upon copying the information, the exemplary MLR triggers an interrupt, causing the parent thread to be notified that the state of the evicted context/thread has been saved, and then terminates execution, step 208d/236d.

Figure 15:
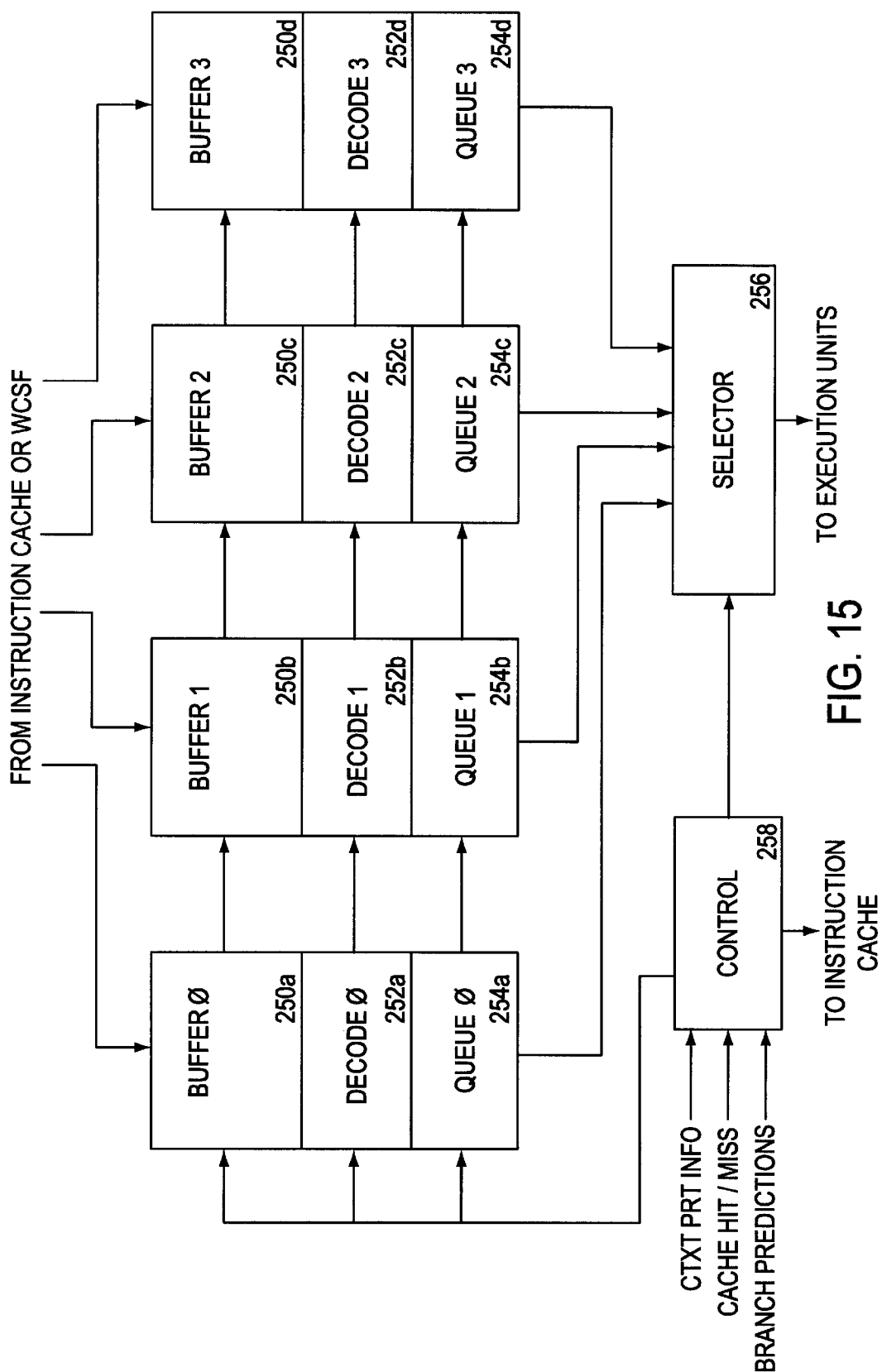
FIG. 15 illustrates one embodiment of IFU of FIG. 1.

FIG. 15 illustrates the presently preferred embodiment of enhanced IFU 12 in further detail. As shown, IFU 12 comprises a plurality of buffers 250a–250d, a plurality of decoders 252a–252d, and a plurality of queues 254a–254d for concurrently fetching, decoding and queuing decoded instructions for a number of active threads and/or MLRs. IFU 12 further comprises selector 256 for selectively dispatching decoded instructions queued in queues 254a–254d to execution units 14, and control circuitry 258 for controlling buffers 250a–250d, 252a–252d, 254a–254d, and selector 256. Control circuitry 258 allocates these resources to the various threads and MLRs in accordance with the execution priority levels of the threads/MLRs and their contexts, stored in their respective context and thread level control register sets 104 and 106. Preferably, control circuitry 258 further factors into consideration other operating conditions, such as cache misses.

Furthermore, control circuitry 258 causes the context and thread identification information to be appended to the instructions as they are dispatched to execution units 14. In the presently preferred embodiment, the context and thread identification information are encoded in the form of context and thread tags. The context and thread tags, among other things, allow execution units 14 to map each instruction to its proper context and thread level control register sets 104 and 106, and translate the virtual operand register addresses to their physical counterparts.

The number of concurrent fetch, decode, and queue paths are typically smaller than the maximum number of concurrent threads and MLRs supported by the control register hierarchy. Under the presently preferred embodiment, 8 concurrent fetch, decode, and queue paths are provided (only 4 are illustrated in FIG. 15). However, the "extra" context/thread level control register sets 104/106 and macro-trap level partitioned subsets 107 allow the state of the "suspended" threads/MLRs to be kept on chip, thereby facilitating much faster execution resumption as control circuitry 258 is able to "reallocate" the fetch/decode/queue paths to some of the "suspended" threads/MLRs.

Figure 16A:
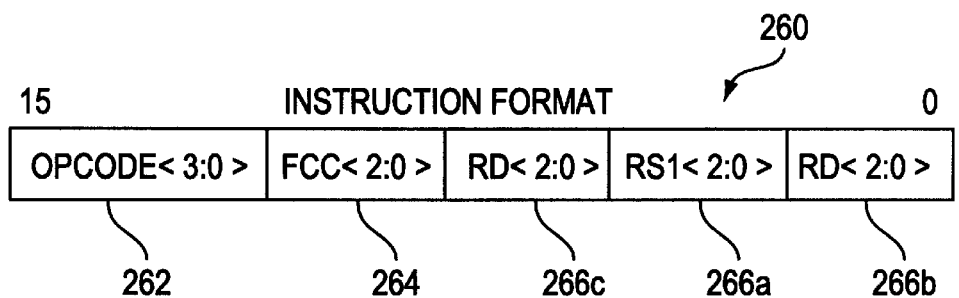
FIGS. 16a–16d illustrate the instruction format, the Branch-on-flag instruction, the Move instruction, and the Boolean AND instruction for the illustrated processor of FIG. 1.

Besides modifications resulting from the normal course of instruction execution, the control registers of primary control register file 20a are directly accessible and modifiable using instructions of the standard instruction set of processor 10. FIGS. 16a–16d illustrate the presently preferred embodiment of the instruction format for instructions of the standard instruction set, and three selected ones of these instructions. As shown in FIG. 16a, each instruction includes integrated functional unit configuration control information (FCC) 264 for dynamically configuring applicable functional units to perform different variations of functions and/or different functions. While FCC 264 complements opcode 262, FCC 264 of each instruction can be provided to the applicable functional unit without requiring IFU 12 to perform any decoding. As a result, instruction decoding by IFU 12 is further speeded up.

Figure 16B:
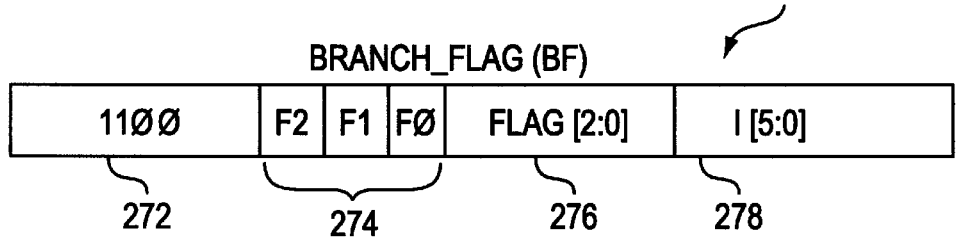
Figure 16C:
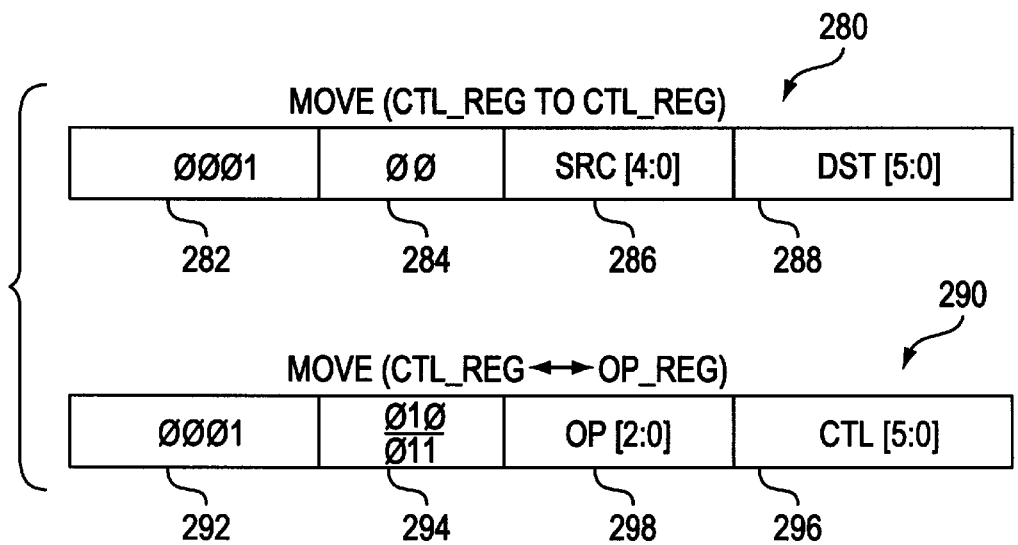
Figure 16D:
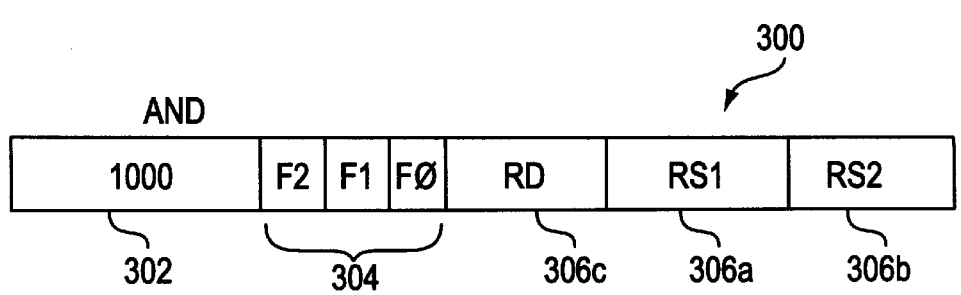

As shown in FIGS. 16b–16d, the standard instruction set includes, in particular, a branch-on-flag instruction 122, a "MOV" instruction 280/290, and an AND instruction 300. Branch-on-flag instruction 122 is used for effectuating instruction branching based on the values of the hardware/software flags in HWFLAG and SWFLAG control registers 112e and 112f of a thread. MOV instruction 280/290 is used for moving "data" between control registers, as well as between control and operand registers. The two like kinds of moves are implemented with the same common "MOV" instruction, i.e., same opcode 262. The differentiation of the two like kinds of moves is denoted by integral FCC information 284/294. Similarly, AND instruction 300 is used for performing either an AND or a NOR operation, depending on integral FCC information 304.

Figure 17:
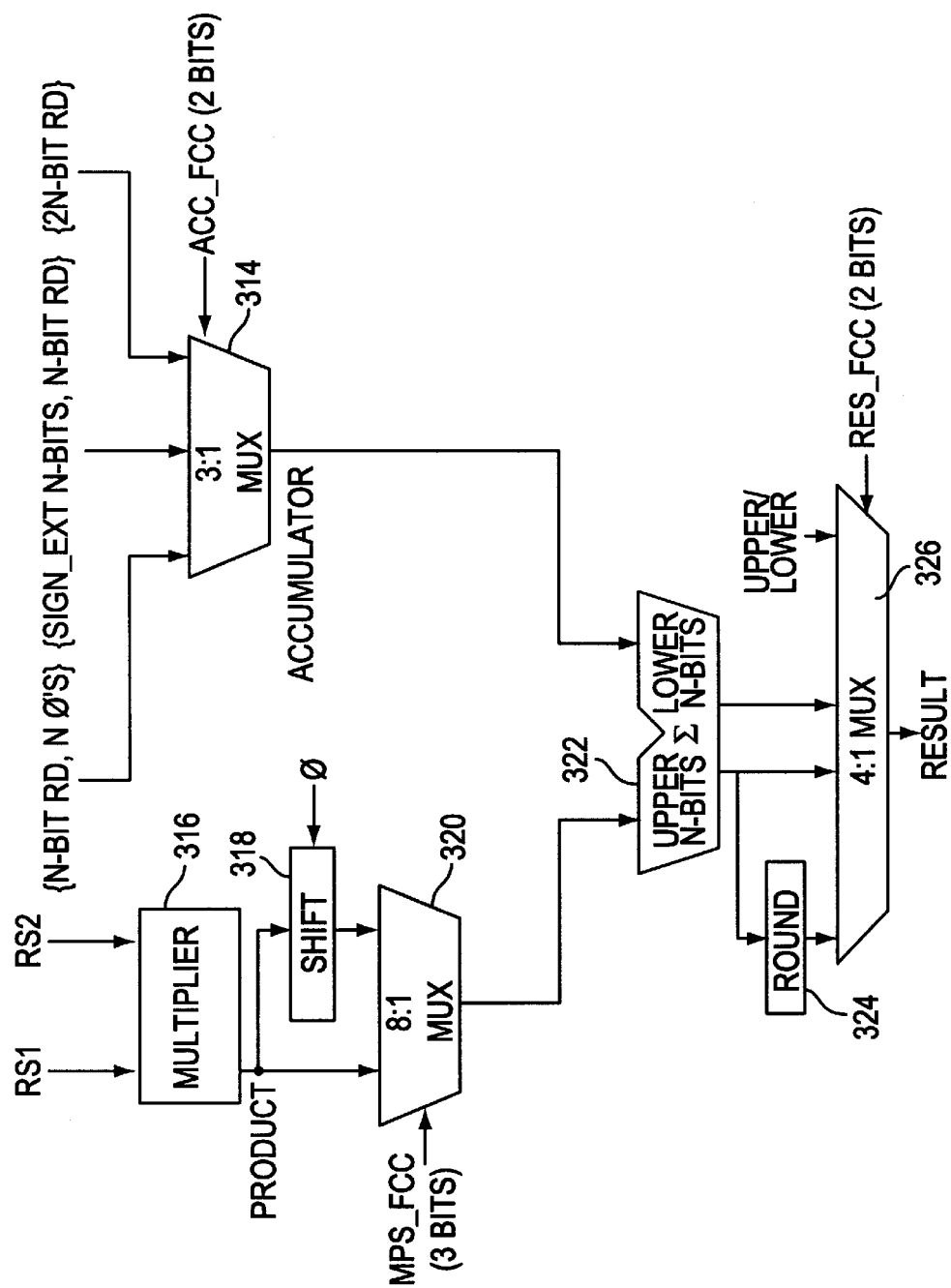
FIG. 17 illustrates an exemplary multiply and accumulate functional unit enhanced to perform different variations of multiply and accumulate in response to functional unit dynamic configuration control information maintained for a thread.

FIG. 17 illustrates one embodiment of an exemplary multiply and accumulate functional unit which has been enhanced to perform different variations of the multiply and accumulate operation, in response to functional unit configuration control information stored in the FCC control register 112d of a thread level control register set 106. As appreciated by those skilled in the art, whenever two n-bit values are multiplied together, the product is a (2n-1) bit value. Thus, at least three issues have to be addressed, i.e. whether the accumulator should provide an n-bit value or a 2n bit value as input, how the (2n-1) bit product value is to be reconciled with a 2n-bit accumulator value, and whether the result should be output as an n-bit or 2n-bit value. As shown, a first 2-bit control value (ACC_FCC), a 3-bit control value (MPS_FCC) and a second 2-bit control value (RES_FCC) can be stored in the thread's FCC register 112d and provided to multiplexors 314, 320, and 326 respectively to address these issues.

Figure 18A:
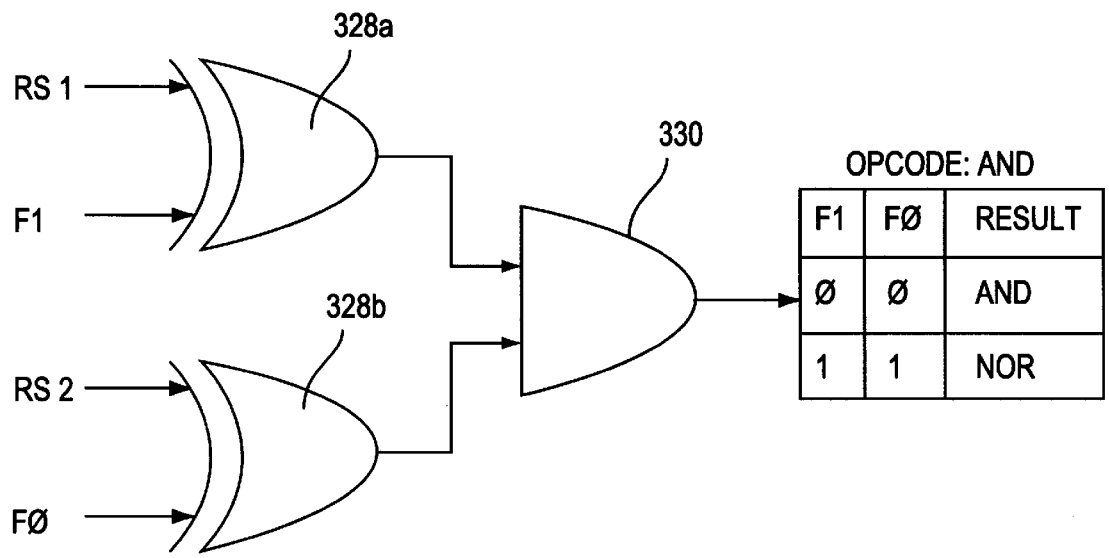
FIGS. 18a–18b illustrate an exemplary AND gate and an exemplary Adder enhanced to perform either a Boolean AND or NOR operation, and an Add or a Subtract operation respectively, in response to integral functional unit dynamic configuration control information of an instruction.
Figure 18B:
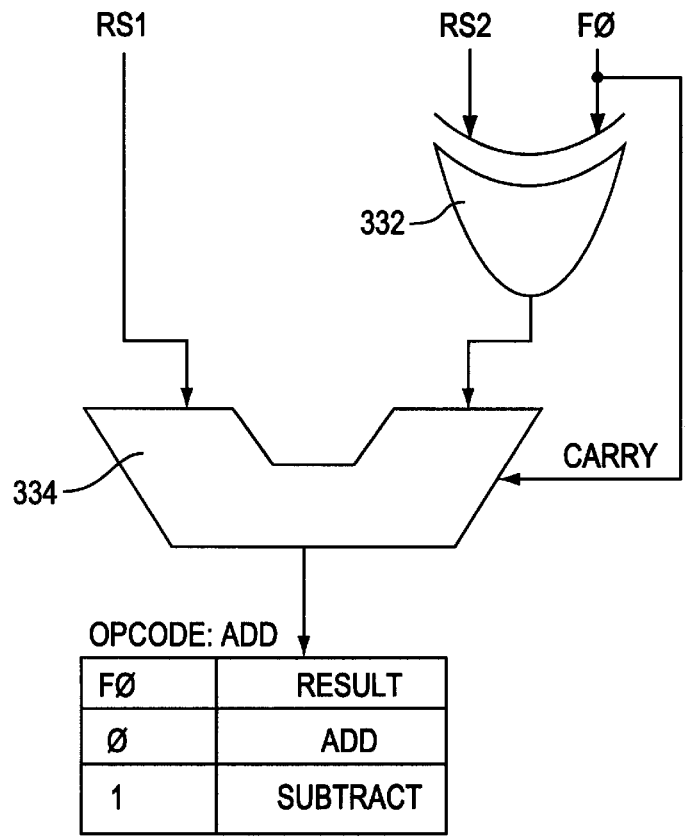

FIGS. 18a–18b illustrate one embodiment each of an AND gate and an arithmetic unit enhanced to perform either the AND or NOR function and either the ADD or Subtract function respectively, in response to integral functional unit configuration control information of an instruction. As shown, AND gate 330 in conjunction with XOR gates 328a–328b will perform either the Boolean AND or NOR operation on the two operands, depending on the values of a first and a second bit of the integral functional unit configuration information of the instruction. Similarly, arithmetic unit 334 in conjunction with XOR gate 332 will perform either an ADD operation or a Subtract operation on the two operands, depending on the value of a particular bit of the integral functional unit configuration information of the instruction.

Figure 19:
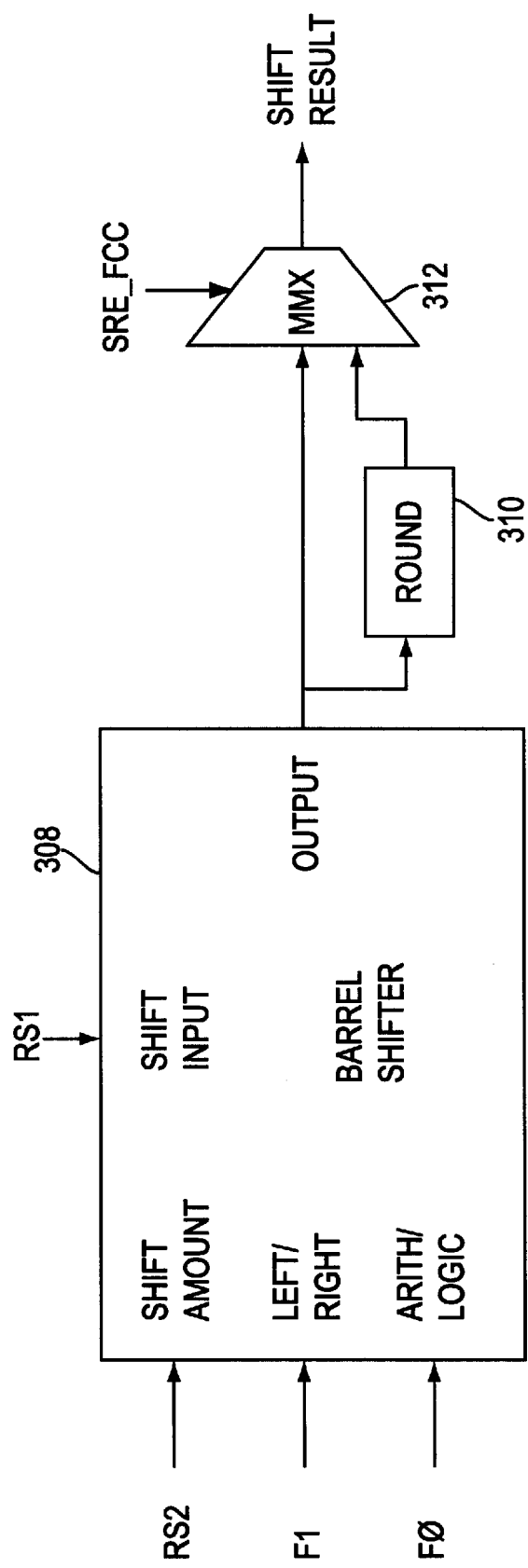
FIG. 19 illustrates an exemplary barrel shifter enhanced to perform different shifting with or without rounding, in response to both types of functional unit dynamic configuration control information.

FIG. 19 illustrates one embodiment each of a barrel shifter enhanced to perform different types of shifts and outputting the results in different formats, in response to integral functional unit configuration control information of an instruction. As shown, barrel shifter 308 in conjunction with rounding unit 310 and multiplexor 312 will perform either arithmetic/logic shift to the left/the right and output the result with or without rounding, in response to the functional unit configuration control information stored in FCC register 112d of the thread as well as integrated with the shift instruction.

Under the present invention, a context and thread based privilege structure is employed to control the direct accesses and modifications of the control registers of primary control register file 20a. The context and thread based privilege structure leverages on the manner the control registers of primary control register file 20a are logically organized. The functional units of execution units 14 are further enhanced to ensure the instructions' threads/contexts have the necessary privileges to access and modify the target control registers. The privileges possessed by the instructions' threads/contexts are located using the instructions' appended context and thread identification tags.

Figure 20:
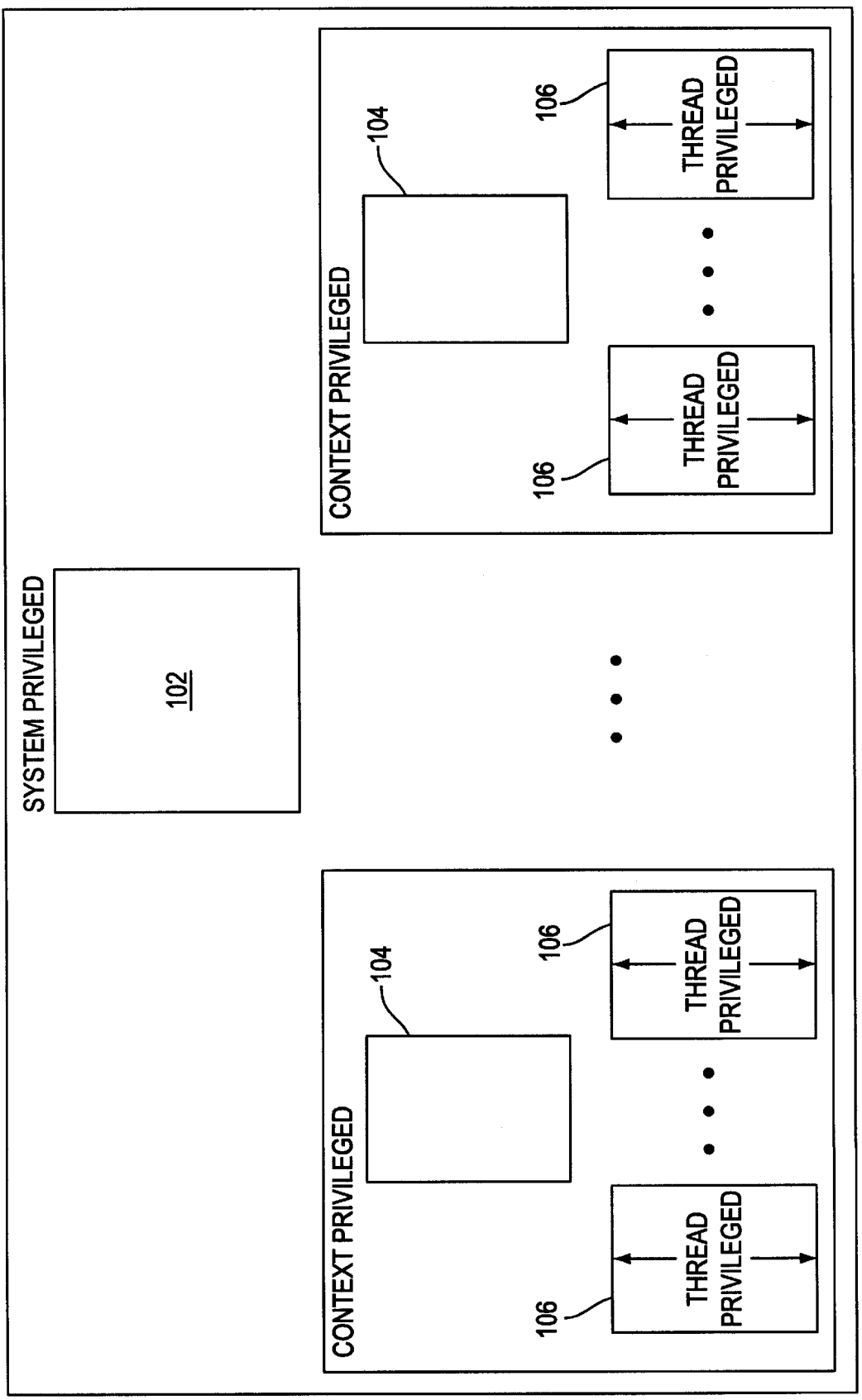
FIG. 20 illustrates the context and thread based privilege approach for controlling accesses and modifications of the control registers under the presently preferred embodiment.

FIG. 20 illustrates the presently preferred embodiment of this context and thread based privilege approach. Each thread is initially conferred a standard thread privilege, which allows the thread to access and modify its own thread level control register set 106. On an as needed basis, one of the threads of each context is temporarily conferred a context privilege, which further allows the context privileged thread to access and modify the thread's context level control register set 104 as well as the peer threads' control register sets 106. Similarly, on an as needed basis, one of the contexts (more specifically, a context privileged thread) is temporarily conferred a system privilege, which further allows the context to access and modify the system level control register set 102 as well as any one of the other "lower level" control register sets 104 and 106.

The conditions under which the privileges are dynamically conferred to and withdrawn from the various threads and contexts are implementation dependent. Under the presently preferred embodiment, the conditions include, in particular, the conditions of encountering certain execution exceptions, under which a thread will be temporarily conferred the privilege for accessing and modifying its context's control register set 104, and a context will be temporarily conferred the privilege for accessing and modifying the system set of control registers 102, by the exception service routines, while the exceptions are being serviced.

In an alternate embodiment, an operating system context including its "micro-kernel" thread is never "swapped out". The context privilege is exclusively conferred to one or more dedicated threads in each context, who in turn provide all services requiring context level privilege to their corresponding child threads. Similarly, the system privilege is exclusively conferred to the operating system context including the "micro-kernel" thread, who in turn provide all services requiring system level privilege to the other contexts. Again, those skilled in the art will appreciate that this too is a degenerate case of the general dynamic privilege model described earlier.

Thus, a processor having a hierarchical control register file, and methods for operating the same has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A processor apparatus including a plurality of control registers organized and arranged in files and sets within the files, the apparatus being adapted for an operating system capable of allocating a plurality of contexts for concurrent execution within an overall system, and threads within the contexts, the apparatus comprising:

a first control register file having a first plurality of the control registers, the first control register file comprising:
a system level control register set adapted to retrievably store information useful for controlling overall system operation, the system level control set including a plurality of active context control registers; and
a plurality of context level control register sets adapted to retrievably store information useful for respectively controlling concurrent execution of a plurality of contexts,
wherein each active context control register stores a first variable control value denoting a corresponding context's privilege level for accessing and modifying contents of the system level and context level control register sets.

2. The processor apparatus as set forth in claim 1, wherein each context level control register set comprises a plurality of active thread control registers adapted to retrievable store control information about executing threads of the respective context.

3. The processor apparatus as set forth in claim 2, wherein each active thread control register stores a first variable control value denoting the corresponding thread's privilege level for accessing and modifying contents of the system level and context level control register sets.

4. The processor apparatus as set forth in claim 1, wherein the first control register file further includes;
a plurality of thread level control register sets adapted to retrievable store information useful for respectively controlling concurrent execution of a plurality of threads for each of the plurality of contexts.

5. The processor apparatus as set forth in claim 4, wherein each thread level control register set comprises a first control register adapted to retrievable store functional unit configuration control information useful for dynamically configuring functional units for the respective thread.

6. The processor apparatus as set forth in claim 5, wherein the execution unit comprises:
a functional unit coupled to the first control register that is capable of performing a first function and a second function and is adapted to perform a selected one of the first and second functions for the respective thread in response to the stored functional unit configuration control information.

7. The processor apparatus as set forth in claim 5, wherein the execution unit comprises:
a functional unit coupled to the first control register that is capable of performing a first variation of a function and a second variation of the function and is adapted to perform a selected one of the first and second variations of the function for the respective thread in response to the stored functional unit configuration control information.

8. The processor apparatus as set forth in claim 4, wherein each thread level control register set comprises a first control register adapted to retrievable store a plurality of software defined flags for the respective thread.

9. The processor apparatus as set forth in claim 8, wherein each context level control register set comprises a second control register adapted to retrievable store a base address pointer to a software flag array and a size of the software flag array.

10. The processor apparatus as set forth in claim 9, wherein each context level control register set further comprises a third control register adapted to retrievably store a first offset to a number of software flag register entries of a corresponding one of the plurality of threads in the software flag array and a count of the entries; and
each thread level control register set further comprises a fourth control register adapted to retrievable store a second offset from the first offset identifying a software flag register entry from which the content of the first control register is to be derived.

11. The processor apparatus as set forth in claim 4, further comprising:
a second control register file having a second plurality of the control registers, the second control register file comprising a plurality of macro-trap level control register sets adapted to retrievable store information useful for respectively controlling execution of a plurality of macro-trap library routines, the macro-trap library routines being caused to be executed by executing ones of the the plurality of threads, the processor being adapted to execute the macro-trap library routines concurrently with the contexts and the threads.

12. The processor apparatus as set forth in claim 11, wherein each macro-trap level control register set comprises a status register adapted to retrievable store status information about the respective macro-trap library routine.

13. The processor apparatus as set forth in claim 4, further comprising:
an instruction fetch unit coupled to the execution unit comprising a plurality of buffers, a plurality of decoders and a plurality of queues for concurrently fetching, decoding and queueing decoded instructions for dispatching to the execution unit for a plurality of threads.

14. The processor apparatus as set forth in claim 13, wherein the instruction fetch unit further comprises a control circuit that appends a context tag and a thread tag to each instruction identifying the context and thread level control register sets with which the instruction is associated.

15. The processor apparatus as set forth in claim 14, wherein the execution unit comprises functional units adapted to control accesses to and modifications of contents of control registers in the system level, context level, and thread level control register sets in accordance with privilege levels associated with the context and/or thread with which the instruction is associated, the privilege levels being stored in the respective context level and thread level control register sets, the functional units using the context and thread tags appended to the instruction to determine the privilege levels.

16. The processor apparatus as set forth in claim 1, further comprising:
at least one execution unit coupled to the control registers that executes first instructions for controlling overall system operation, the first instructions referencing the system level control register set control registers, and second instructions for controlling execution of one of the contexts, the second instructions referencing the control registers of the respective one of the context level control register sets.

17. A processor apparatus including a plurality of control registers organized and arranged in files and sets within the files, the apparatus being adapted for an operating system capable of allocating a plurality of contexts for concurrent execution within an overall system, and threads within the contexts, the apparatus comprising:
a first control register file having a first plurality of the control registers, the first control register file comprising:
a plurality of context level control register sets adapted to retrievably store information useful for respectively controlling concurrent execution of a plurality of contexts, each context level control set including a plurality of active thread control registers; and
a plurality of thread level control register sets adapted to retrievably store information useful for respectively controlling concurrent execution of a plurality of threads associated with each of the contexts,
wherein each active thread control register stores a first variable control value denoting a corresponding thread's privilege level for accessing and modifying contents of the context level and thread level control register sets.

18. The processor apparatus as set forth in claim 17, further comprising:
at least one execution unit coupled to the control registers that executes first instructions for controlling execution of the respective one of the contexts, the first instructions referencing the control registers of one of the context level control register sets, and second instructions for controlling execution of one of the respective one of the threads, the second instructions referencing the control registers of one of the thread level control register sets.

19. A processor apparatus including a plurality of control registers organized and arranged in files and sets within the files, the apparatus being adapted for an operating system capable of allocating a plurality of contexts for concurrent execution within an overall system, and threads within the contexts the apparatus comprising:

a first control register file having a first plurality of the control registers, the first control register file comprising:
- a plurality of thread level control register sets adapted to retrievably store information useful for respectively controlling concurrent execution of a plurality of threads, and
- a plurality of active thread control registers,
- wherein each active thread control register stores a first variable control value denoting a corresponding thread's privilege level for accessing and modifying contents of the thread level control register sets;

a second control register file having a second plurality of the control registers, the second control register file comprising a plurality of macro-trap level control register sets adapted to retrievably store information useful for respectively controlling concurrent execution of a plurality of child macro-trap library routines of the threads; and at least one execution unit coupled to the control registers that executes instructions that reference the control registers in accordance with the sets and files in which they are arranged.

20. A processor apparatus adapted for a computer operating system having a heirarchy of contexts, and threads within the contexts, the apparatus comprising:

a first control register for storing a plurality of software defined flags for a thread, a second control register for storing a base address pointer to a software flag array and a size of the array of the thread's context, a third control register for storing a first offset to a number of software flag register entries and a count of the entries of the thread, and a fourth control register for storing a second offset from the first offset identifying a software flag register entry from which the contents of the first control register are to be obtained.

* * * * *